(12) United States Patent
Hill et al.

(10) Patent No.: US 12,234,192 B2
(45) Date of Patent: Feb. 25, 2025

(54) METHODS OF FORMING ARTICLES HAVING SPINEL-BASED OXIDES CONTAINING MAGNESIUM, ALUMINUM AND TITANIUM

(71) Applicant: Skyworks Solutions, Inc., Irvine, CA (US)

(72) Inventors: Michael David Hill, Emittsburg, MD (US); David Bowie Cruickshank, Rockville, MD (US); David Martin Firor, Thurmont, MD (US); Iain Alexander Macfarlane, Insch (GB); Jeffrey Alan Shunkwiler, Adamstown, MD (US); John Jianzhong Jiang, Leesburg, VA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 18/394,922

(22) Filed: Dec. 22, 2023

(65) Prior Publication Data

US 2024/0124361 A1 Apr. 18, 2024

Related U.S. Application Data

(62) Division of application No. 16/514,876, filed on Jul. 17, 2019, now Pat. No. 11,891,340.

(Continued)

(51) Int. Cl.
*C04B 35/465* (2006.01)
*B32B 18/00* (2006.01)
(Continued)

(52) U.S. Cl.
CPC ............ *C04B 35/465* (2013.01); *B32B 18/00* (2013.01); *C04B 35/265* (2013.01);
(Continued)

(58) Field of Classification Search
CPC .... H01P 1/387; H01P 1/00; H01P 1/39; H01P 11/00; C04B 2235/3206;
(Continued)

(56) References Cited

U.S. PATENT DOCUMENTS 5,479,695 A 1/1996 Grader et al.
7,378,363 B2 5/2008 Zheng et al.
(Continued)

FOREIGN PATENT DOCUMENTS

EP 0656330 6/1995
WO WO 2013/173639 11/2013

OTHER PUBLICATIONS

Harris et al., "Tuning of structure and magnetic anisotropy in microwave ferrites", J. Jpn. Soc. Powder Metallurgy, vol. 61(S1):S273-S279 (2014).

(Continued)

*Primary Examiner* — Holly Rickman
*Assistant Examiner* — Linda N Chau
(74) *Attorney, Agent, or Firm* — Knobbe, Martens, Olson & Bear, LLP

(57) ABSTRACT

The disclosed technology generally relates dielectric materials and methods of forming the same, and more particularly to a combination of co-fireable dielectric materials that can be attached to each other without the use of adhesives. In an aspect, a composite article comprises a magnetic portion comprising a nickel zinc ferrite. The composite article additionally comprises a non-magnetic portion contacting the magnetic portion, the non-magnetic portion comprising a spinel-structured oxide comprising $Mg_{2-x}Al_{2x}Ti_{1-x}O_4$ and having a dielectric constant between about 7 and 14, wherein $0<x\leq1$.

20 Claims, 25 Drawing Sheets

Related U.S. Application Data

(60) Provisional application No. 62/702,274, filed on Jul. 23, 2018.

(51) Int. Cl.
    *C04B 35/26*     (2006.01)
    *C04B 35/443*     (2006.01)
    *C04B 35/64*     (2006.01)
    *C04B 37/00*     (2006.01)
    *C04B 41/00*     (2006.01)
    *H01P 1/387*     (2006.01)
    *H01P 11/00*     (2006.01)

(52) U.S. Cl.
    CPC .......... *C04B 35/2658* (2013.01); *C04B 35/64* (2013.01); *C04B 37/00* (2013.01); *C04B 37/001* (2013.01); *C04B 41/0072* (2013.01); *H01P 1/387* (2013.01); *H01P 11/00* (2013.01); *C04B 35/443* (2013.01); *C04B 2235/656* (2013.01); *C04B 2235/763* (2013.01); *C04B 2235/77* (2013.01); *C04B 2235/94* (2013.01); *C04B 2237/34* (2013.01); *C04B 2237/765* (2013.01); *C04B 2237/84* (2013.01)

(58) Field of Classification Search
    CPC .... C04B 2235/3232; C04B 2235/3234; C04B 2235/3236; C04B 2235/3284; C04B 2235/656; C04B 2235/763; C04B 2235/77; C04B 2235/80; C04B 2235/94; C04B 2237/34; C04B 2237/343; C04B 2237/346; C04B 2237/765; C04B 2237/84; C04B 35/265; C04B 35/2658; C04B 35/443; C04B 35/465; C04B 35/478; C04B 35/64; C04B 41/0072; C04B 37/00; C04B 37/001

See application file for complete search history.

(56) References Cited

U.S. PATENT DOCUMENTS

| | | |
|---|---|---|
| 7,687,014 B2 | 3/2010 | Zheng et al. |
| 11,891,340 B2 | 2/2024 | Hill et al. |
| 2003/0090335 A1 | 5/2003 | Lombardi et al. |
| 2011/0193649 A1 | 8/2011 | Popelka et al. |
| 2013/0321090 A1 | 12/2013 | Cruickshank et al. |
| 2018/0166763 A1 | 6/2018 | Cruickshank et al. |
| 2019/0081377 A1 | 3/2019 | Hill et al. |
| 2019/0322587 A1 | 4/2019 | Hill et al. |

OTHER PUBLICATIONS

International Search Report and Written Opinion dated Nov. 6, 2019 in PCT Application No. PCT/US2019/042592; 10 pages.

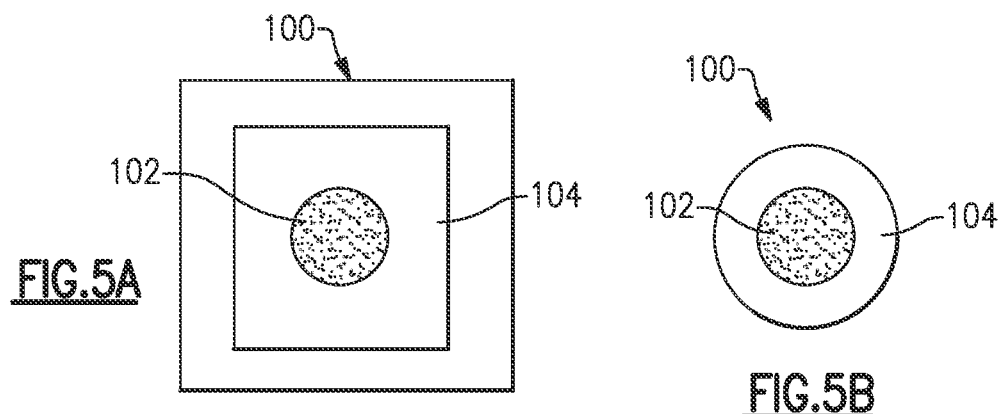
FIG.5A
FIG.5B
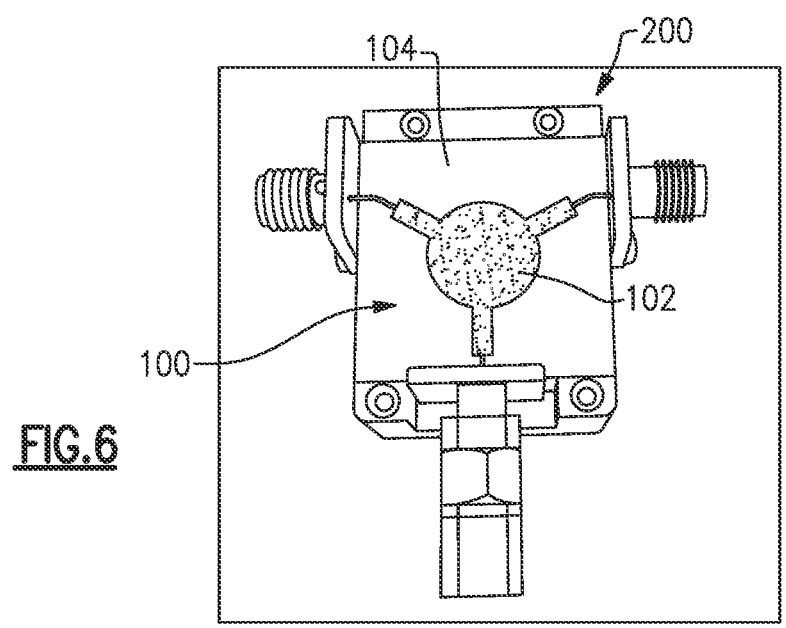
FIG.6
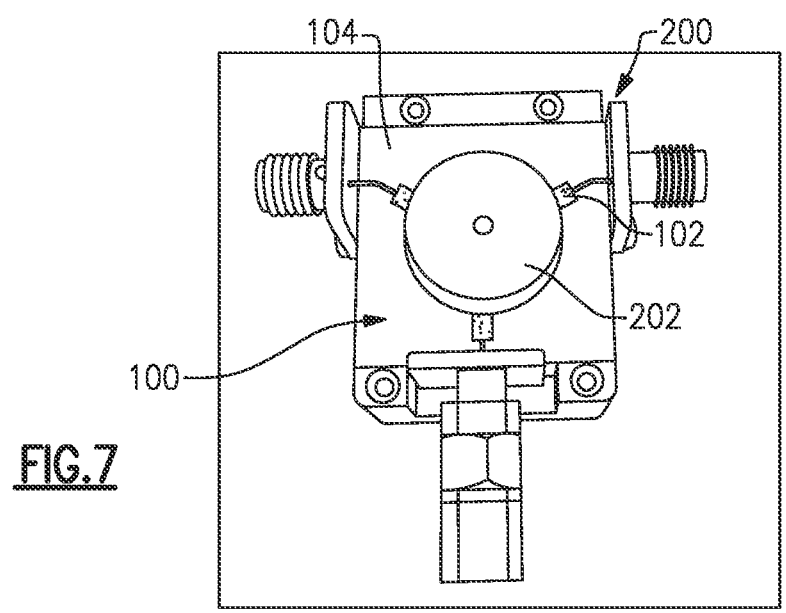
FIG.7

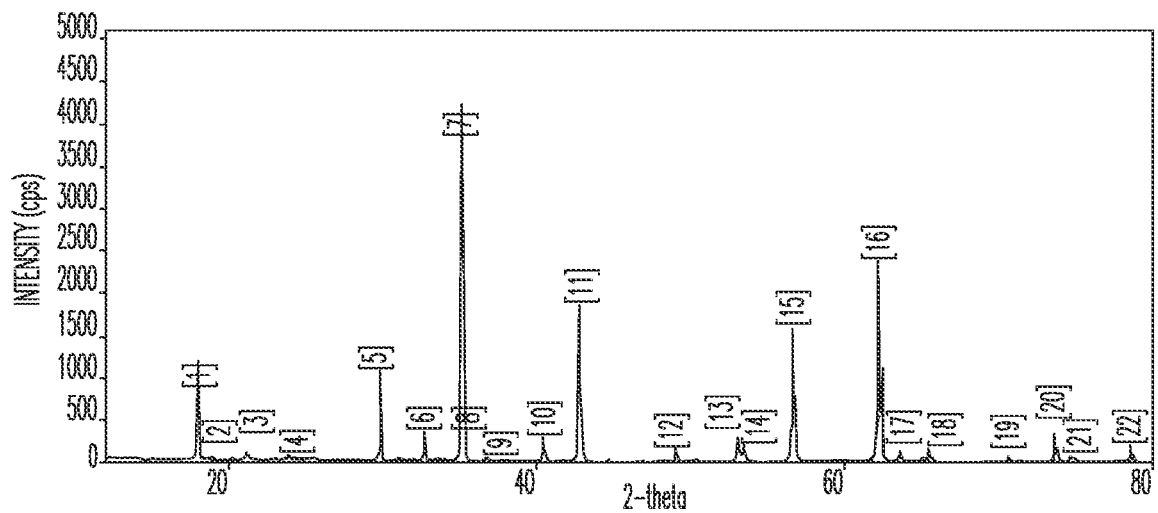

| No. | 2-theta (deg) | d (ang.) | FWHM (deg) | Int. I (cps deg) | Int. W (deg) | Phase data name |
|---|---|---|---|---|---|---|
| 1 | 18.117(7) | 4.8925(18) | 0.123(6) | 71.6(18) | 0.16(2) | Unknown |
| 2 | 19.0442 | 4.65628 | 0.122991 | 1.29496 | 0.113392 | Magnesium zinc trioxotitanate(0,0,3) |
| 3 | 21.14(3) | 4.199(5) | 0.15(3) | 5.3(9) | 0.16(10) | Magnesium zinc trioxotitanate(1,0,1) |
| 4 | 23.8761 | 3.72379 | 0.146042 | 1.69469 | 0.113676 | Magnesium zinc trioxotitanate(0,1,2) |
| 5 | 29.869(4) | 2.9889(4) | 0.076(6) | 61.4(18) | 0.107(14) | Unknown |
| 6 | 32.738(9) | 2.7332(7) | 0.096(12) | 21.0(10) | 0.13(3) | Magnesium zinc trioxotitanate(1,0,4) |
| 7 | 35.198(4) | 2.5476(3) | 0.076(4) | 235(7) | 0.109(10) | Unknown |
| 8 | 35.334(13) | 2.5381(9) | 0.050(19) | 10(4) | 0.07(5) | dimagnesium titanate, qandilite high, syn(3,1,1), spinel (Ti,Zn), |
| 9 | 36.71(7) | 2.446(4) | 0.28(5) | 4.7(9) | 0.3(2) | dimagnesium titanate, qandilite high, syn(2,2,2), spinel (Ti,Zn), |
| 10 | 40.484(7) | 2.2263(4) | 0.066(7) | 13.6(7) | 0.09(2) | Magnesium zinc trioxotitanate(1,1,-3) |
| 11 | 42.815(4) | 2.1104(2) | 0.082(4) | 117(2) | 0.118(11) | dimagnesium titanate, qandilite high, syn(4,0,0), spinel (Ti,Zn), |
| 12 | 49.006(12) | 1.8573(4) | 0.094(11) | 8.5(6) | 0.12(4) | Magnesium zinc trioxotitanate(0,2,4) |
| 13 | 53.142(6) | 1.72205(17) | 0.073(8) | 19.7(11) | 0.11(3) | dimagnesium titanate, qandilite high, syn(4,2,2), spinel (Ti,Zn), |
| 14 | 53.481(7) | 1.7119(2) | 0.096(13) | 13.8(11) | 0.14(5) | Magnesium zinc trioxotitanate(1,1,-6) |
| 15 | 56.655(3) | 1.62330(9) | 0.086(3) | 106.4(17) | 0.125(12) | dimagnesium titanate, qandilite high, syn(5,1,1), Magnesium zin |
| 16 | 62.236(4) | 1.49048(9) | 0.079(6) | 161(4) | 0.125(11) | dimagnesium titanate, qandilite high, syn(4,4,0), spinel (Ti,Zn), |
| 17 | 63.587(14) | 1.4620(3) | 0.082(17) | 8.6(6) | 0.12(5) | Unknown |
| 18 | 65.445(10) | 1.4249(2) | 0.115(12) | 13.3(9) | 0.17(6) | dimagnesium titanate, qandilite high, syn(5,3,1), Magnesium zin |
| 19 | 70.62(2) | 1.3327(4) | 0.11(2) | 5.5(7) | 0.13(7) | dimagnesium titanate, qandilite high, syn(6,2,0), spinel (Ti,Zn), |
| 20 | 73.641(8) | 1.28528(12) | 0.122(6) | 24.4(10) | 0.14(3) | dimagnesium titanate, qandilite high, syn(5,3,3), spinel (Ti,Zn), |
| 21 | 74.64(2) | 1.2706(3) | 0.11(2) | 5.6(6) | 0.14(7) | dimagnesium titanate, qandilite high, syn(6,2,2), spinel (Ti,Zn), |
| 22 | 78.580(11) | 1.21640(14) | 0.096(12) | 14.7(8) | 0.14(4) | dimagnesium titanate, qandilite high, syn(4,4,4), spinel (Ti,Zn), |

FIG.9B

METHODS OF FORMING ARTICLES HAVING SPINEL-BASED OXIDES CONTAINING MAGNESIUM, ALUMINUM AND TITANIUM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The disclosed technology generally relates dielectric materials, and more particularly to a combination of co-fireable dielectric materials that can be attached to each other without the use of adhesives.

Description of the Related Art

Circulators and isolators are passive electronic devices that are used in high-frequency (e.g., microwave) radio frequency systems to permit a signal to pass in one direction while providing high isolation to reflected energy in the reverse direction. Circulators and isolators commonly include a disc-shaped assembly comprising a disc-shaped ferrite or other ferromagnetic ceramic element, disposed concentrically within an annular dielectric element.

A conventional process for making the above-referenced composite disc assemblies is illustrated by the flow diagram of FIG. 1. At step 12, a cylinder is formed from a dielectric ceramic material. At step 14, the (unfired or "green") cylinder is then fired in a kiln (commonly referred to simply as "firing"). Thus, the ceramic material is "fireable". At step 16, the outside surface of the cylinder is then machined to ensure its outside diameter (OD) is of a selected dimension. Achieving precise dimensions in the assembly elements is important because the dimensions affect microwave waveguide characteristics. At step 18, the inside surface of the cylinder is similarly machined to ensure its inside diameter (ID) is of a selected dimension. In addition, at step 20, a rod is formed from a magnetic ceramic material. At step 22, the rod is then fired, and at step 24 its surface is machined to a selected OD. The rod OD is slightly less than the cylinder OD so that the rod can be fitted securely within the cylinder, as described below. Achieving a close fit that promotes good adhesion between the rod and cylinder is a reason that both the outside surface of the rod and the inside surface of the cylinder are machined to precise tolerances.

At step 26, epoxy adhesive is applied to the one or both of the rod and cylinder. At step 28, the rod is inserted inside the cylinder to form a rod-and-cylinder assembly, and the epoxy is allowed to cure (harden), as indicated by step 30. At step 32, the outside surface of the rod-and-cylinder assembly is again machined to a precise OD. Lastly, at step 34, the rod-and-cylinder assembly is sliced into a number of disc assemblies. Each disc assembly thus comprises a magnetic ceramic disc disposed concentrically within a dielectric ceramic ring. Each disc assembly is typically several millimeters in thickness.

The time involved in machining the inside surface of the cylinder to promote adhesion, applying epoxy to the parts, carefully handling and assembling the epoxy-laden parts, and curing the epoxy, contributes to inefficiency in the process. It would be desirable to provide a more efficient method for making composite magnetic-dielectric disc assemblies.

SUMMARY

In one aspect, a method of forming a composite article comprises providing a pre-sintered magnetic article and providing a green article contacting the pre-sintered magnetic article, wherein the green article comprises one or more precursor oxides having a ratio of magnesium (Mg):aluminum (Al):titanium (Ti) of $(2-x):(2x):(1-x)$, wherein $0<x<1$. The method additionally comprises sintering the green article by co-firing the pre-sintered magnetic article and the green article at a co-firing temperature between 1300° C. and 1450° C. Co-firing causes the precursor oxides to form a non-magnetic spinel-structured oxide comprising $Mg_{2-x}Al_{2x}Ti_{1-x}O_4$ having a dielectric constant between about 7 and 14.

In another aspect, a composite article comprises a magnetic portion comprising a nickel zinc ferrite. The composite article additionally comprises a non-magnetic portion contacting the magnetic portion, the non-magnetic portion comprising a spinel-structured oxide comprising $Mg_{2-x}Al_{2x}Ti_{1-x}O_4$ and having a dielectric constant between about 7 and 14, wherein $0<x<1$.

BRIEF DESCRIPTION OF THE DRAWINGS

FIG. 5A illustrates an embodiment of a composite tile having a square shape.

FIG. 5B illustrates an embodiment of a composite tile having a circular shape.

FIG. 6 illustrates an integrated microstrip circulator without a magnet.

FIG. 7 illustrates an integrated microstrip circulator with a magnet.

FIG. 9B illustrates experimental dilatometry measurements for a second spinel-structured oxide comprising $Mg_2Ti_2O_4$, according to embodiments.

DETAILED DESCRIPTION

Disclosed herein are embodiments of low firing dielectric materials. These materials can be co-fired with high dielectric materials to form composites for magnetic-dielectric assemblies, such as for isolator and circulator applications. Advantageously, embodiments of the disclosed materials can be co-fired without needing any adhesives, such as glue, epoxy or other chemical adhesives. Thus, composites formed out of embodiments of the disclosure can be glue free, epoxy free, or adhesive free.

Embodiments of the disclosure could advantageously allow for 5G systems, in particular operating at 3 GHz and above, to form integrated architectures which can include different components, such as antennas, circulators, amplifiers, and/or semiconductor based amplifiers. By allowing for the integration of these components onto a single substrate, this can improve the overall miniaturization of the device. In some embodiments, the disclosed devices can be operable at frequencies between about 1.8 GHz and about 30 GHz. In some embodiments, the disclosed device can be operable at frequencies of greater than about 1, 2, 3, 4, 5, 10, 15, 20, or 25 GHz. In some embodiments, the disclosed device can be operable at frequencies of less than 30, 25, 20, 15, 10, 5, 4, 3, or 2 GHz.

Figure 1:
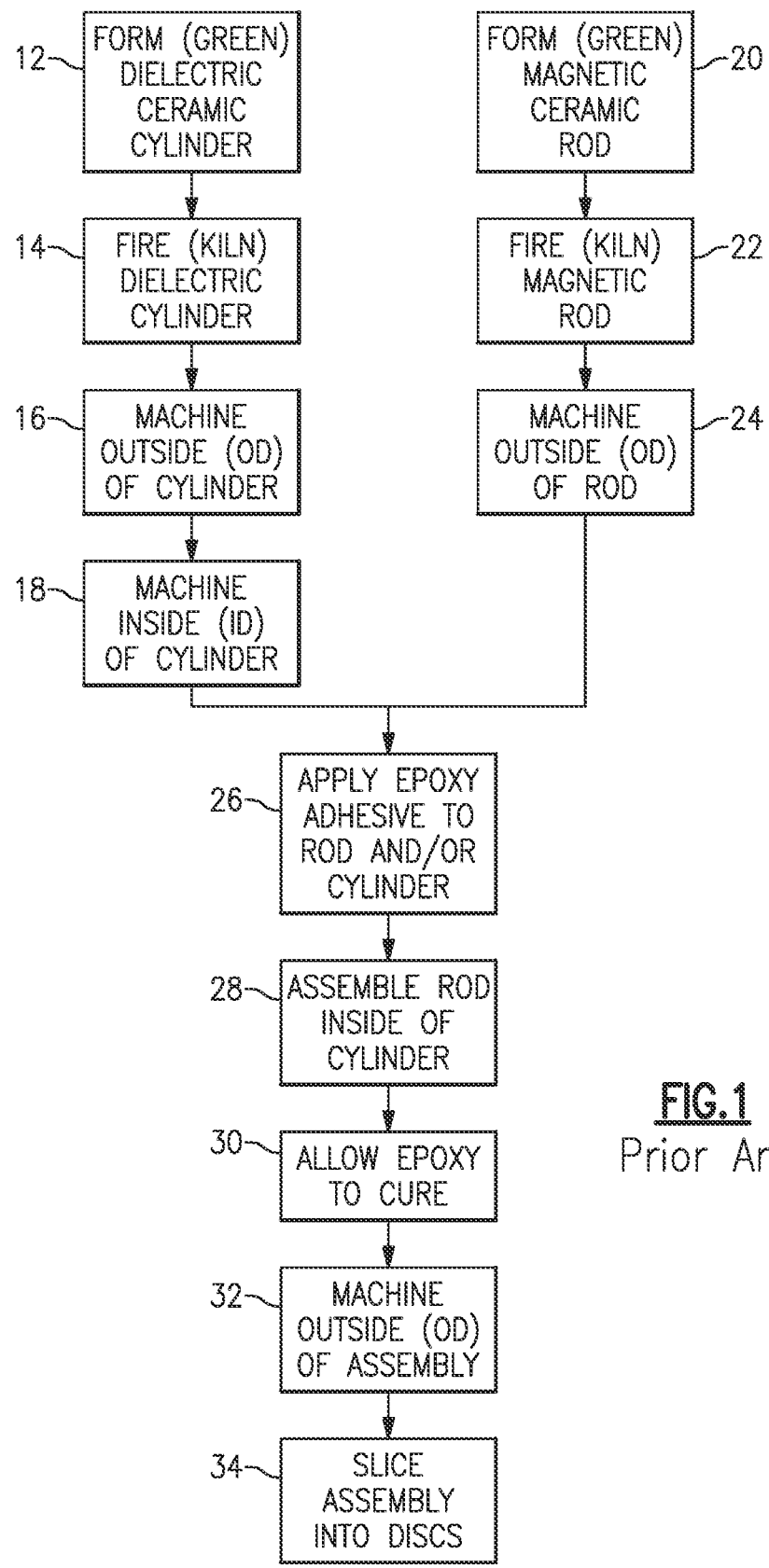
FIG. 1 illustrates a flow diagram of a method for fabricating composite magnetic-dielectric disc assemblies in accordance with the prior art.
Figure 2:
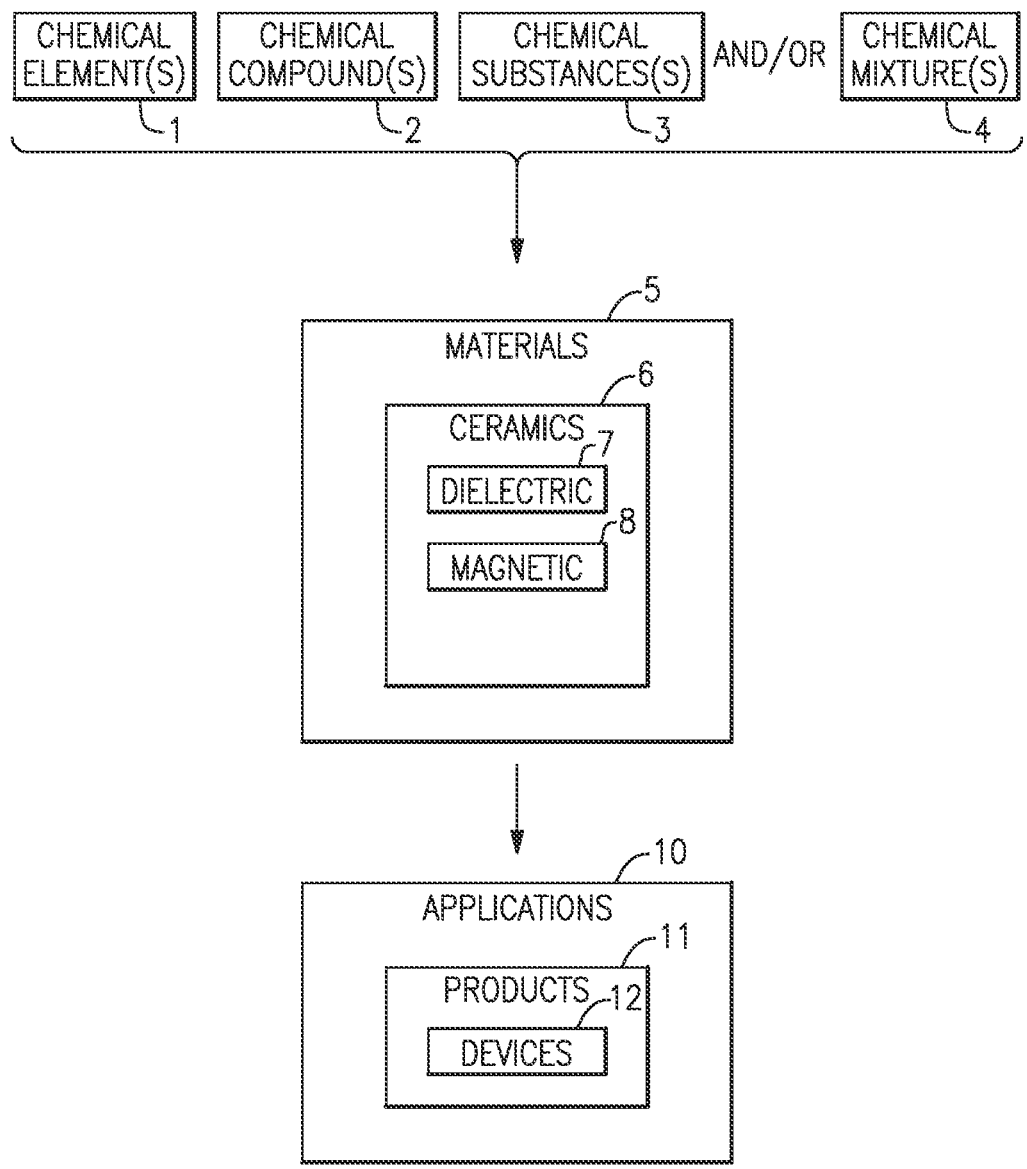
FIG. 2 schematically shows how materials having one or more features described herein can be designed, fabricated, and used.

In some embodiments, the integrated architecture can include a directional coupler and/or isolator in a package size which is not much larger than a standard isolator. In some embodiments, the integrated architecture can include a high power switch. In addition to using the dielectric tile as the substrate for the impedance transformer, it could also be used as the substrate for the coupler, switch and termination FIG. 2 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into ceramic materials (block 6) configured to include a desirable dielectric property (block 7), a magnetic property (block 8).

In some embodiments, a material having one or more of the foregoing properties can be implemented in applications (block 10) such as radio-frequency (RF) application. Such applications can include implementations of one or more features as described herein in devices 12. In some applications, such devices can further be implemented in products 11. Examples of such devices and/or products are described herein.

Microstrip Circulators/Isolators

Circulators are passive multiport devices which can receive and transmit different signals, such as microwave or radiofrequency (RF). These ports can be an external waveguide or transmission line which connects to and from the circulator. Isolators are similar to circulators, but one or more of the ports can be blocked off. Hence, circulator and isolator can be used interchangeably herein as they can be similar in general structural. Thus, all discussion below can apply both to circulators and isolators.

Microstrip circulators and isolators are devices known in the art consist of a thin film circuit deposited over a substrate, such as a dielectric ferrite substrate. In some embodiments, one or more ferrite discs can be adhered onto the substrate. Magnet(s) can then be further attached to circulate a signal through the ferrite disc.

Further, all-ferrite microstrip circulators have been used as well, in particular for radar T/R modules. Circuitry can be printed onto the all ferrite microstrip circulator and a magnet can be added on top to direct the signal. For example, a metallization pattern is formed onto a ferrite substrate. Typically, the metallization pattern consists of a central disc and multiple transmission lines.

Figure 3:
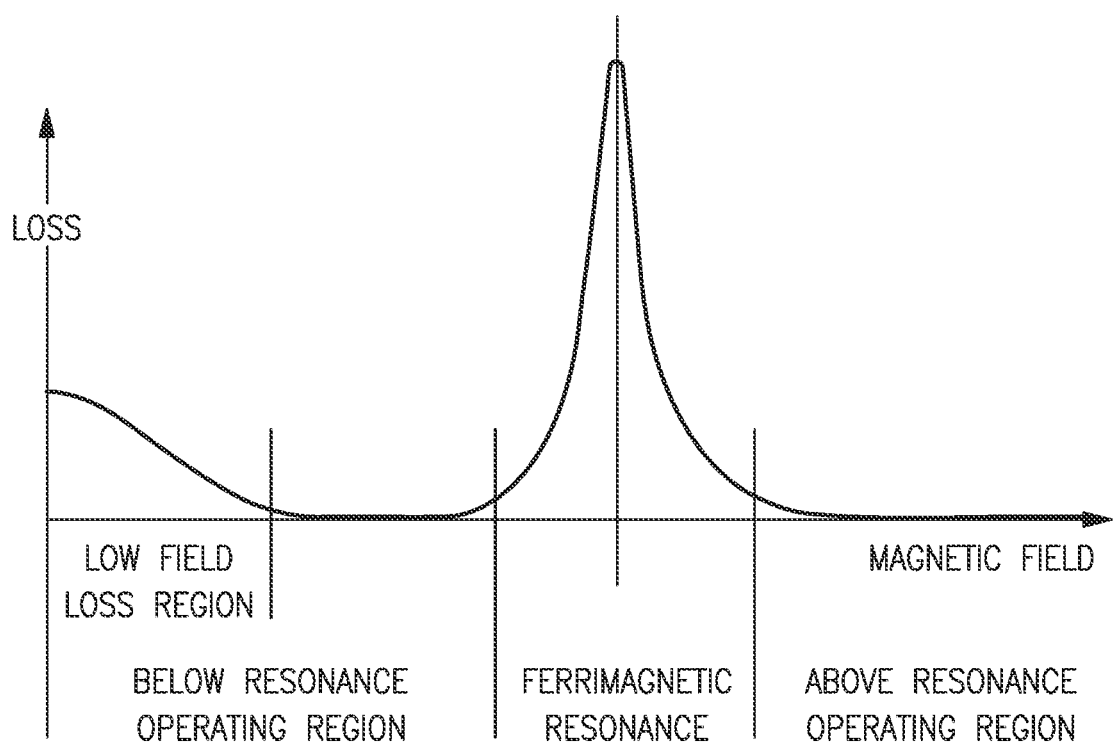
FIG. 3 illustrates a magnetic field v. loss chart.

Circulators generally can operate in either of the above or below resonance operating regions. This is shown in FIG. 3. In some embodiments, above-resonance frequencies can be advantageous for narrow band, sub 4 GHz circulators. For higher frequencies, the below resonance region can be more advantageous.

Microstrip circulators in particular typically work in the below resonance operating region. They use a very small magnet or can be self-biased, such as in the case of hexagonal ferrites. However, square tiles can be a difficult shape to magnetize uniformly, in particular for the all-ferrite microstrip circulators known in the art. Thus, they will operate close to the low field loss region. When transformers are mounted on the lossy unmagnetized ferrite, performance suffers. Further, increased power will make the poor performance even more known. Thus, circulators known in the art suffer from issues due to the ferrite tile being poorly magnetized, leading to poor insertion loss and intermodulation distortion (IMD), and power performance.

Co-Fired Microstrip Circulators/Isolators

Embodiments of the disclosure can improve overall magnetization and reduce performance issues that can occur for currently known microstrip circulators. Generally, the microstrip circulators can be formed by embedding a ferrite disc, such as an oxide ferrite disc made of YIG, directly into a dielectric substrate. The combination can then be co-fired to form a more solid composite structure. Additionally circuitry, such as formed from silver or other metalized substances, can be added. Without the co-firing process, circuit metallization would not be able to be applied. Embodiments of this disclosure can alleviate some of the significant problems of the art.

Any number of different ferrite disc materials that can be used. In some embodiments, the saturation magnetization levels of the ferrite disc material can range between 1000-5000 (or about 1000-about 5000) gauss.

Further, any number of different dielectric substrates known in the art can be used. Further, the dielectric can be formed form dielectric powder or low temperature co-fired ceramic (LTCC) tape. In some embodiments, the dielectric constant can be above 6, 10, 15, 20, 25, 30, 40, 50, or 60. In some embodiments, the dielectric constant can range from 6-30 (or about 6 to about 30). In some embodiments, the dielectric constant can be below about 60, 50, 40, 30, 25, 20, 15, or 10.

Figure 4A:
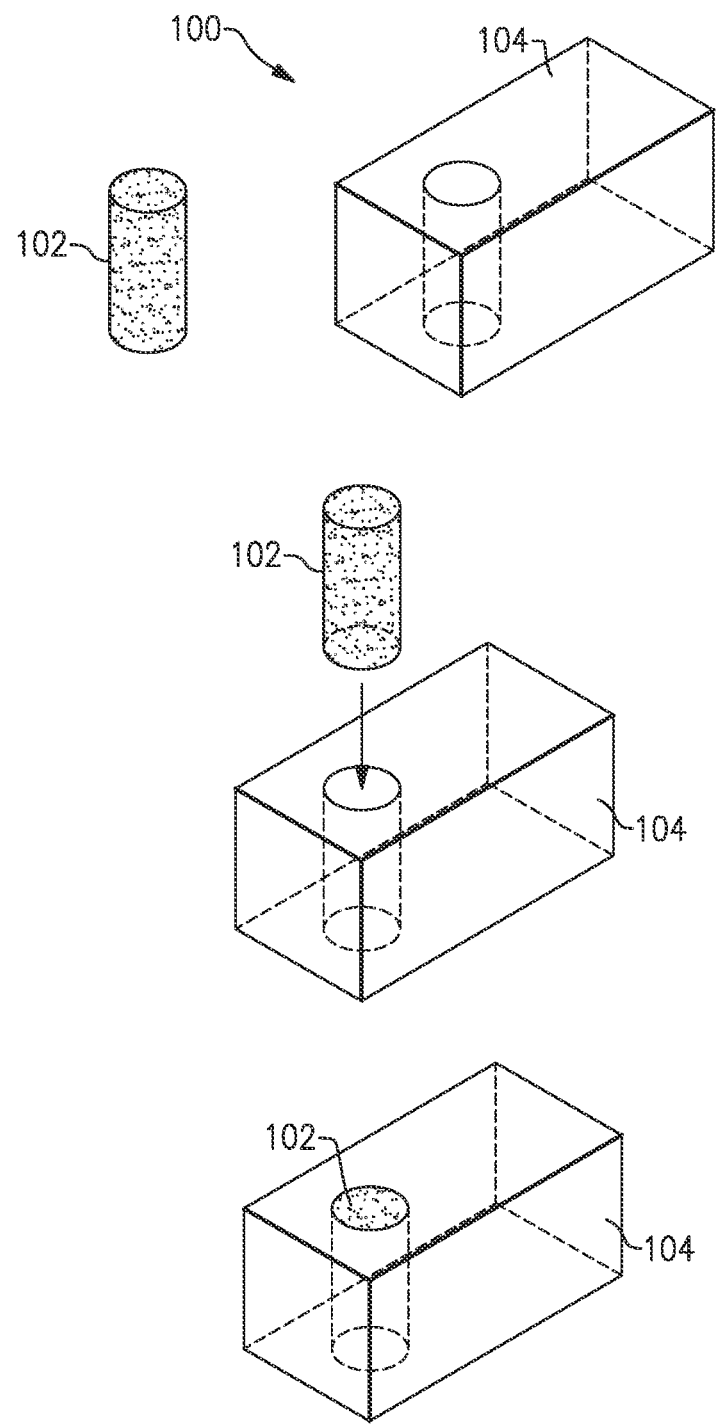
FIG. 4A illustrates an embodiment of a composite structure having a ferrite cylinder within a rectangular prism.
Figure 4B:
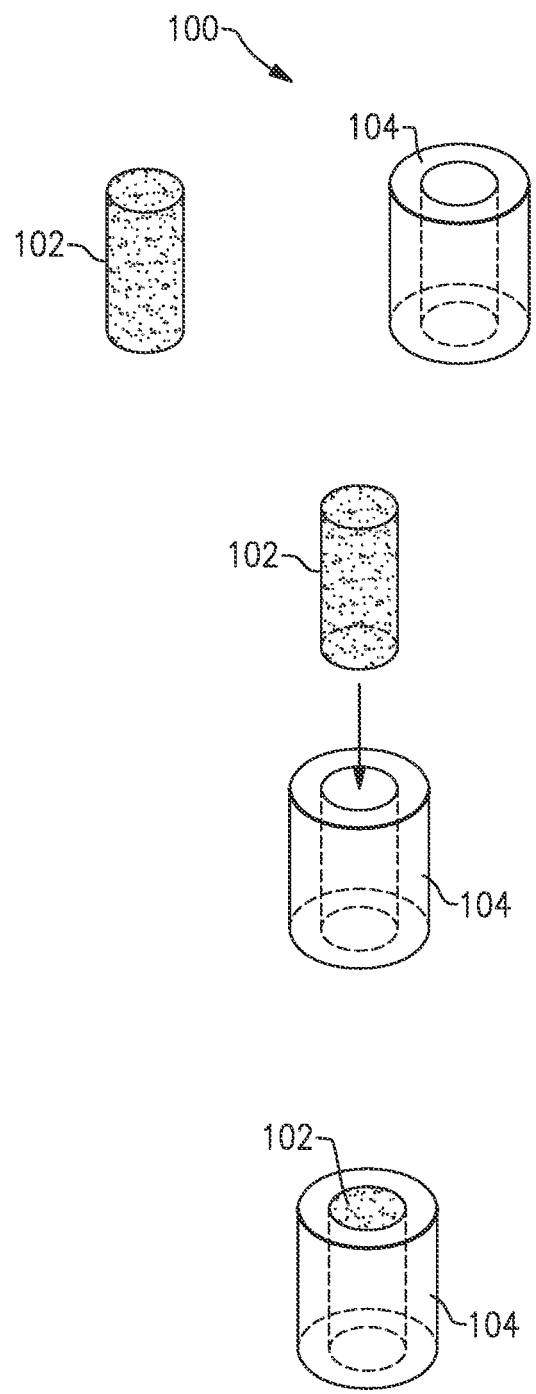
FIG. 4B illustrates an embodiment of a composite structure having a ferrite cylinder within a cylindrical substrate.

In particular, to form the composite microstrip circulator 100, a magnetic oxide disc 102, or other magnetic disc, can be inserted into an aperture of a dielectric substrate 104 as shown in FIGS. 4A-B. In some embodiments, the disc 102 can be a cylindrical rod, though the particular shape is not limiting. The disc 102 can be green, previously fired, or not-previously fired.

Further, the substrate 104 can generally be a rectangular prism as shown in FIG. 4A, but other shapes can be used as well such as the cylinder shown in FIG. 4B. Embodiments of the substrate 104 are disclosed in more detail below. Once the disc 102 is inside the substrate 104, the components can be co-fired together, using such a method as discussed in U.S. Pat. No. 7,687,014, hereby incorporated by reference in its entirety and discussed below. This co-firing process, further detailed below, can cause the substrate 104 to shrink around the disc 102 and hold it in place in conjunction with adhesives to form the composite structure 100. This composite structure 100 can then be sliced to form the chip structure as shown in FIGS. 5A-B (FIG. 5A showing the rectangular prism slice and FIG. 5B showing the cylinder slice). However, in some embodiments, slicing is not performed and the components are co-fired together at their final thickness. In some embodiments, a plurality of different discs can be inserted into a single substrate in a plurality of different apertures.

Thus, in some embodiments a magnetic oxide disk can be co-fired into a square or rectangular dielectric substrate, or any other shaped substrate, which can then serve as a platform for other components, such as circuitry. This composite structure can then be magnetized to serve as a microstrip circulator and/or isolator package, for example, or the ferrite disc could have been magnetized prior to insertion. In some embodiments, the ferrite disc can be magnetized prior to the co-firing step.

Once the composite structure is formed, other components can be added onto the substrate, such as additional thin film circuits and the like. Thus, embodiments of the disclosure can form an integrated solution which can include a directional coupler and/or isolator in a package size which is not much larger than a standard isolator. Further, advantageously loss may not be affected by the level of magnetic field, or can at least be reduced. In some embodiments, the disclosed circulator will be no larger (and depending on the ferrite/dielectric combination chosen could be smaller) than all current ferrite microstrip circulators.

Thus, using a co-firing process, a ferrite disc can be embedded into a dielectric tile, as shown in FIGS. 5A-5B. The thin ferrite disc shown in the figure can be significantly easier to magnetize uniformly than a square, or other oddly shaped piece, known in the art. In some embodiments, the dielectric tile could be about 25 mm square though the particular dimensions are not limiting. This can be used in the 3-4 (or about 3-about 4) GHz region.

Using the dielectric tile, a transformer can then be produced as shown in FIG. 6. As shown, the substrate 104 has space left over for other component attachments. After forming the transformer, only a small magnet needs to be placed on the tile, as shown in FIG. 7. Thus, assembly time can be much shorter than previously done.

In addition to using the dielectric tile as the substrate for the impedance transformer, it could also be used as the substrate for the coupler, switch, and termination. Thus, a number of other components can be added onto the substrate after co-firing, reducing the overall footprint of the device. Further, circuit metallization could be added, but only after the device has been co-fired.

Spinel-Based Materials with Low Dielectric Constants for Co-Firing with Nickel Zinc Ferrites Embodiments of the disclosure can be particularly advantageous for forming a composite article by co-firing a pre-fired article and a green article, e.g., a pre-fired magnetic material and a non-magnetic green article to form circulators/isolators described above. The green article comprises one or more precursor oxides having a ratio of magnesium (Mg):aluminum (Al):titanium (Ti) of $(2-x):(2x):(1-x)$, wherein $0<x<1$. For example, a rod of magnetic material, such as a nickel-zinc-ferrite material, can be inserted into an opening formed in the green article comprising the one or more precursor oxides, such as shown in FIGS. 4A-4B above (104 being the substrate and 102 being the disc). The combination of the ring and the rod can then be co-fired together so that the ring shrinks around the rod. Both of these materials can be "fireable," meaning they have the ability to be fired or sintered in an oven/kiln/other heating device. In some embodiments, firing can change one or more properties of the material, such as the ceramic materials discussed herein. When the green article according to embodiments is sintered by co-firing the pre-fired magnetic article and the green article at a co-firing temperature between 1300° C. and 1450° C., the compositions of the one or more precursor oxides are such that co-firing causes the precursor oxides to form a non-magnetic spinel-structured oxide comprising $Mg_{2-x}Al_{2x}Ti_{1-x}O_4$ having a dielectric constant between about 7 and 14. Embodiments of these assemblies can be used as isolators and/or circulators for radiofrequency applications, such as for 5G applications.

Still referring to FIGS. 4A-4B, advantageously, the co-firing results in the disc 102 and the substrate 104, comprising the pre-fired magnetic material and the non-magnetic green article, respectively, that shrink in different amounts, e.g., the substrate 104 shrinking in a higher amount relative to the disc 102, such that the resulting disc 102 and the substrate 104 are mechanically held together without the use of adhesives/epoxies/glues, thereby enabling a "glueless assembly" of forming the composite article. Previous iterations of the assembly fire the fireable ring separate from the fireable rod due to the temperature for firing the ring being too high, which can lead to melting, or at least considerably damaging the properties of the internal rod. Either both segments can be fired separately, or the ring can be fired first and then the ring/rod assembly is fired together. For each of these approaches, the ring may not sufficiently shrink around the rod and thus an adhesive may be needed to keep the ring and the rod attached to one another.

However, the use of adhesives has a number of drawbacks. For example, it is extremely difficult, if not impossible, to metallize the assembly once there is adhesive. This is because the temperature required for metallization is much higher than the use temperature for the adhesive, causing the adhesive to melt and/or lose adhesive. In contrast, according to embodiments, the disclosed combination of materials and methods result in a composite structure without the need for such adhesive, as the disc 102 and the substrate 104 can be held together as-co-fired due to the differential shrinkage between the pre-fired magnetic material and the non-magnetic green article.

Further, the glue is lossy, increasing the insertion loss of glued components. The dielectric loss of the glue at high frequencies is greater than the magnetic or the dielectric material In various embodiments, spinel-based materials according to embodiments can have a dielectric constant (c') that is less than 15 (or less than about 15). Thus, embodiments of the disclosure can be used for 5G below resonance applications. It can be advantageous to avoid molding and to offset the impedance effect of thinner substrates also used at high frequencies. Accordingly, spinel-based materials having values below 15 (or below about 10) are used for above 20 GHz frequencies.

Further, embodiments of the material can have low dielectric constants (<15) suitable for co-firing with high magnetization spinels (for example nickel zinc ferrites) such as those disclosed in U.S. Pat. Pub. No. 2017/0098885, which is hereby incorporated by reference in its entirety, in particular for high frequency (5G) applications. Having a low dielectric constant can prevent a phenomenon called overmolding. This can also lead to manageable device sizes at mm-wave frequencies.

According to various embodiments, the composite article formed according to the methods described herein can have a magnetic inner, core or surrounded portion (e.g., 102 in FIGS. 4A-4B) and a nonmagnetic outer, shell or surrounding portion (e.g., 104 in FIGS. 4A-4B). The composite article can be one of those described above with respect to FIGS. 4A-4B and 5A-5B, e.g., such as a composite article having a magnetic cylinder, rod or a disc surrounded by a nonmagnetic material. According to various embodiments, a composite article has a magnetic portion comprising a nickel zinc ferrite and a non-magnetic portion contacting the magnetic portion, where the non-magnetic portion comprises a spinel-structured oxide comprising Mg, Al and Ti. In some embodiments, the spinel-structured oxide comprises $Mg_{2-x}Al_{2x}Ti_{1-x}O_4$, wherein $0<x<1$. The spinel-structured oxide has a dielectric constant less than about 15. When the magnetic portion forms the inner portion 102, e.g., a disc, and the non-magnetic portion forms the outer portion 104, e.g., a substrate surrounding the inner portion 102 as illustrated in FIGS. 4A-4B and 5A-5B, the inner portion 102 and the outer portion 104 can be held together without an adhesive therebetween, when processed according to the co-firing process described herein.

Advantageously, the spinel-structured oxide according to embodiments can be formed by sintering a green article comprising one or more precursor oxides having a ratio of magnesium (Mg):aluminum (Al):titanium (Ti) of $(2-x):(2x):(1-x)$, wherein $0<x<1$. The compositions of the one or more precursor oxides are such that co-firing causes the one or more precursor oxides to form a non-magnetic spinel-structured oxide comprising $Mg_{2-x}Al_{2x}Ti_{1-x}O_4$ having a dielectric constant between about 7 and 14. In some embodiments, the non-magnetic spinel-structure oxide comprises a magnesium aluminum oxide and a magnesium titanium oxide, e.g., a solid solution of $MgAl_2O_4$ and $Mg_2TiO_4$. In some embodiments, the one or more precursor oxides comprise: one or more Mg-containing oxides such as $MgO_2$, $MgAl_2O_4$, and $Mg_2TiO_2$; one or more Al-containing oxides such as $Al_2O_3$ and $MgAl_2O_4$; and one or more Ti-containing oxides such as a titanium oxide and $Mg_2TiO_2$. In some embodiments, the one or more precursor oxides further comprises an additional or excess $Al_2O_3$ in an amount greater than zero and less than or equal to about 10 percent on the basis of a total weight of the one or more precursor oxides. In some embodiments, the one or more precursor oxides further comprises an additional or excess $ZnTiO_3$ in an amount greater than zero and less than or equal to about 10 percent on the basis of a total weight of the one or more precursor oxides. In some embodiments, thus formed spinel-structured oxide comprises $MgAl_2O_4$ and $Mg_2TiO_4$. In some embodiments, thus formed spinel-structured oxide further comprises additional or excess $Al_2O_3$ in the amount greater than zero and less than or equal to about 10 percent on the basis of a total weight of the spinel-structured oxide. In some embodiments, thus formed spinel-structured oxide further comprises additional or excess $ZnTiO_3$ in the amount greater than zero and less than or equal to about 10 percent on the basis of a total weight of the spinel-based oxide.

The spinel structured oxide according to embodiments can be used as a low dielectric constant material that is co-firable with high magnetization spinels, such as lithium ferrite or nickel zinc ferrite. It can be advantageous to use this material to avoid moding, and to offset the impedance effect of thinner substrates that may be used at high frequencies. The spinel structured oxide can further be particularly useful for high frequency microstrip or surface integrated waveguide designs.

Some prior approaches have used polymeric materials as the low dielectric constant material. However, such material have relatively high loss, poor temperature stability of the dielectric constant and poor thermal management properties. The spinel-structured oxides according to various embodiments provide an advantage over prior approaches with respect to at least these aspects.

As described above, the spinel-structured oxide can include a first spinel-structured oxide comprising $MgAl_2O_4$ and a second spinel-structured oxide comprising $Mg_2TiO_4$, which can form a solid solution. In the following, the first and second spinel-structured oxides are described in detail.

In some embodiments, the first spinel-structured oxide comprising $MgAl_2O_4$ further comprises one or both of $ZnTiO_3$ and $Al_2O_3$. When included, $ZnTiO_3$ can be present in the amount of 2-10%, 2-4%, 4-6%, 6-8% or 8-10%, for instance about 8.95%, on the basis of the total weight of the first spinel-structured oxide. When included, $Al_2O_3$ can be present in the amount of 2-16%, 2-4%, 4-6%, 6-8%, 8-10% or 12-14%, 14-16%, for instance about 6.15%, on the basis of the total weight of the first spinel-structured oxide. In various embodiments, $MgAl_2O_4$ can be present in the amount of 80-100%, 80-82%, 82-84%, 84-86%, 86-88%, 88-90%, 90-92%, 92-94%, 94-96%, 96-98% or 98-100%, for instance about 84.90%, on the basis of the total weight of the first spinel-structured oxide. It will be appreciated that, in various embodiments, the amount of $MgAl_2O_4$ is sufficient to preserve the spinel crystal structure of the first spinel-structured oxide.

According to various embodiments, when prepared according to methods described herein, the first spinel-structured oxide comprising $MgAl_2O_4$ has a dielectric constant of 5-11, 5-6, 6-7, 7-8, 8-9, 9-10 and 10-11, e.g., 7.97.

According to various embodiments, when prepared according to methods described herein, the first spinel-structured oxide comprising $MgAl_2O_4$ has an as-fired density of about 3.50-3.75 g/cc, 3.50-3.55 g/cc, 3.55-3.60 g/cc, 3.60-3.65 g/cc, 3.65-3.70 g/cc and 3.70-3.75 g/cc, for instance 3.569 g/cc.

In some embodiments, the second spinel-structured oxide comprising $Mg_2TiO_4$ further comprises one or both of $ZnTiO_3$ and $Al_2O_3$. When included, $ZnTiO_3$ can be present in the amount of 2-10%, 2-4%, 4-6%, 6-8% or 8-10%, for instance about 8.95%, on the basis of the total weight of the second spinel-structured oxide. When included, $Al_2O_3$ can be present in the amount of 2-16%, 2-4%, 4-6%, 6-8%, 8-10% or 12-14%, 14-16%, for instance about 6.15%, on the basis of the total weight of the second spinel-structured oxide. In various embodiments, $MgTiO_4$ can be present in the amount of 80-100%, 80-82%, 82-84%, 84-86%, 86-88%, 88-90%, 90-92%, 92-94%, 94-96%, 96-98% or 98-100%, for instance about 84.90%, on the basis of the total weight of the second spinel-structured oxide. It will be appreciated that, in various embodiments, the amount of $MgTiO_4$ is sufficient to preserve the spinel crystal structure of the second spinel-structured oxide.

According to various embodiments, when prepared according to methods described herein, the second spinel-structured oxide comprising $Mg_2TiO_4$ has a dielectric constant of 10-16, 10-11, 11-12, 12-13, 13-14, 14-15 and 15-16, e.g., 13.27.

According to various embodiments, when prepared according to methods described herein, the second spinel-structured oxide comprising $MgTi_2O_4$ has a density between of about 3.40-3.65 g/cc, 3.40-3.45 g/cm, 3.45-3.50 g/cm, 3.50-3.55 g/cc, 3.55-3.60 g/cc and 3.60-3.65 g/cc, for instance 3.498 g/cc. According to various embodiments, e.g., the composite article embodiments described above with respect to FIGS. 4A-4B and 5A-5B, the non-magnetic portion comprising the spinel-based structure comprises a solid solution comprising the first spinel-structured oxide comprising $MgAl_2O_4$ and the second spinel-structured oxide comprising $Mg_2TiO_4$. It will be appreciated that a solid solution is formed when specific combinations of materials are dissolved in each other, which may be distinguishable from a mixture that does not form a solid solution. For example, without limitation, a mixture can form a solid solution when a crystal structure of a first material serving as a solvent is unchanged by the presence of a second material serving as a solute. According to embodiments, because both of the first spinel-structured oxide comprising $MgAl_2O_4$ and the second spinel-structured oxide comprising $Mg_2TiO_4$ may have spinel structures, the resulting solid solution can have a spinel crystalline structure in which atoms of one of $MgAl_2O_4$ or $Mg_2TiO_4$ are distributed, e.g., uniformly distributed within the crystal lattice of the other of $MgAl_2O_4$ and $Mg_2TiO_4$. However, embodiments are not so limited, and the spinel structured oxide can comprise a mixture in which regions or domains are predominantly $MgAl_2O_4$ or predominantly $Mg_2TiO_4$.

According to various embodiments, the spinel-structured oxide of the non-magnetic portion comprises a solid solution in which the first spinel-structured oxide comprising $MgAl_2O_4$ or the second spinel-structured oxide comprising $Mg_2TiO_4$, relative to a combination thereof, is in a range of 1-10%, 11-20%, 21-30%, 31-40%, 41-50%, 51-60%, 61-70%, 71-80%, 81-90%, 91-99%, or a range defined by any of these values, such that the spinel-structured oxide of the non-magnetic portion can be represented by the chemical formula $Mg_{2-x}Al_{2x}Ti_{1-x}O_4$, wherein $0<x<1$.

The inventors have found that, when the spinel-structured oxide comprising a solid solution is formed by a first spinel-structured oxide comprising $MgAl_2O_4$ and a second spinel-structured oxide comprising $Mg_2TiO_4$ as end components, various material properties such as the dielectric constant, density and thermal expansion coefficient can be advantageously continuously tuned within the corresponding end values.

In some embodiments, one or more material properties of the solid solution formed using a first spinel-structured oxide comprising $MgAl_2O_4$ and a second spinel-structured oxide comprising $Mg_2TiO_4$ as end components can be tuned continuously based on the relative amounts of the first and second spinel-structured oxide. By way of example, when the first spinel-structured oxide comprising $MgAl_2O_4$ has a dielectric constant of 7.97 and the second spinel-structured oxide comprising $Mg_2TiO_4$ has a dielectric constant of 13.27, the dielectric constant of the resulting solid solution can have any value between these end values, depending on the relative amounts of the end components. Any other physical parameter described herein can be tuned in a similar manner.

In various embodiments, first and second spinel-structured oxides have a sintering temperature (e.g., firing temperature) in any range defined by two values selected from 1250, 1260, 1270, 1280, 1290, 1300, 1310, 1320, 1330, 1340, 1350, 1360, 1370, 1380, 1390, 1400, 1410, 1420, 1430, 1440, 1450, 1460, 1470, 1480, 1490 and 1500° C., e.g., 1250-1500° C. or 1350-1400° C.

Figure 8A:
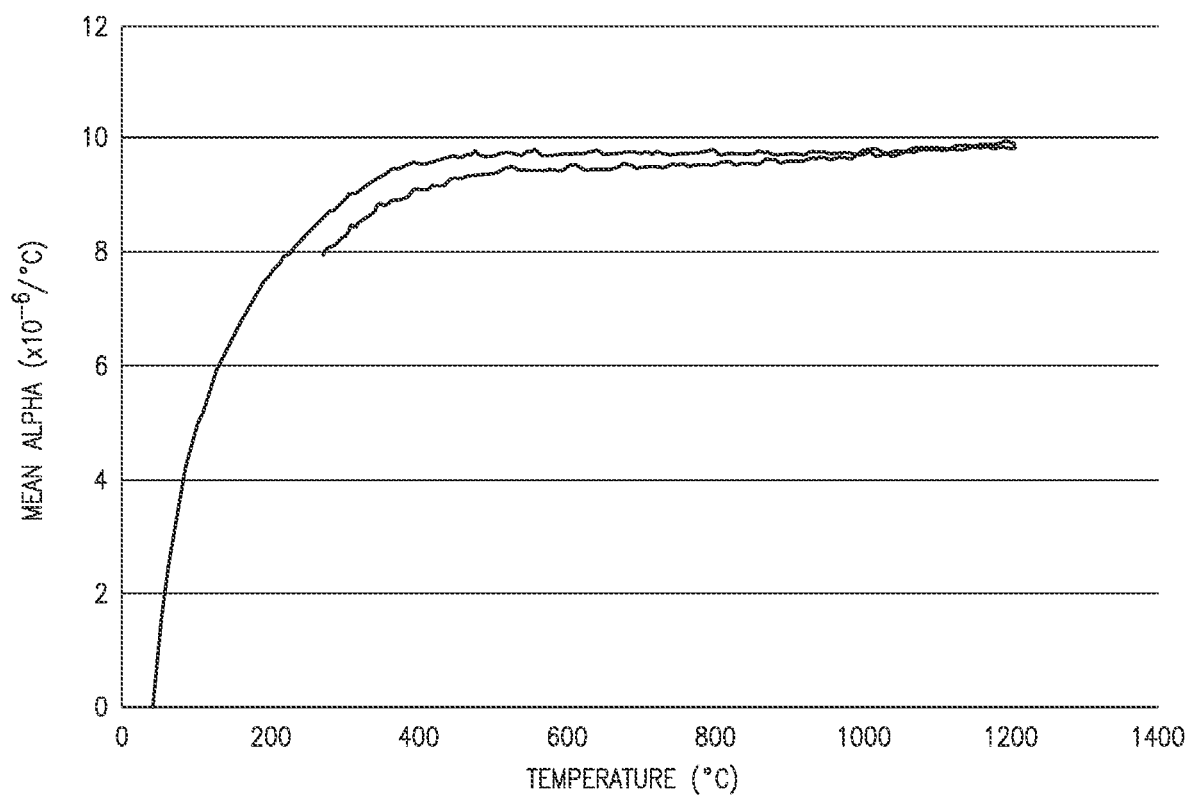
FIG. 8A illustrates experimental dilatometry measurements for a nickel zinc ferrite, according to embodiments.
Figure 8B:
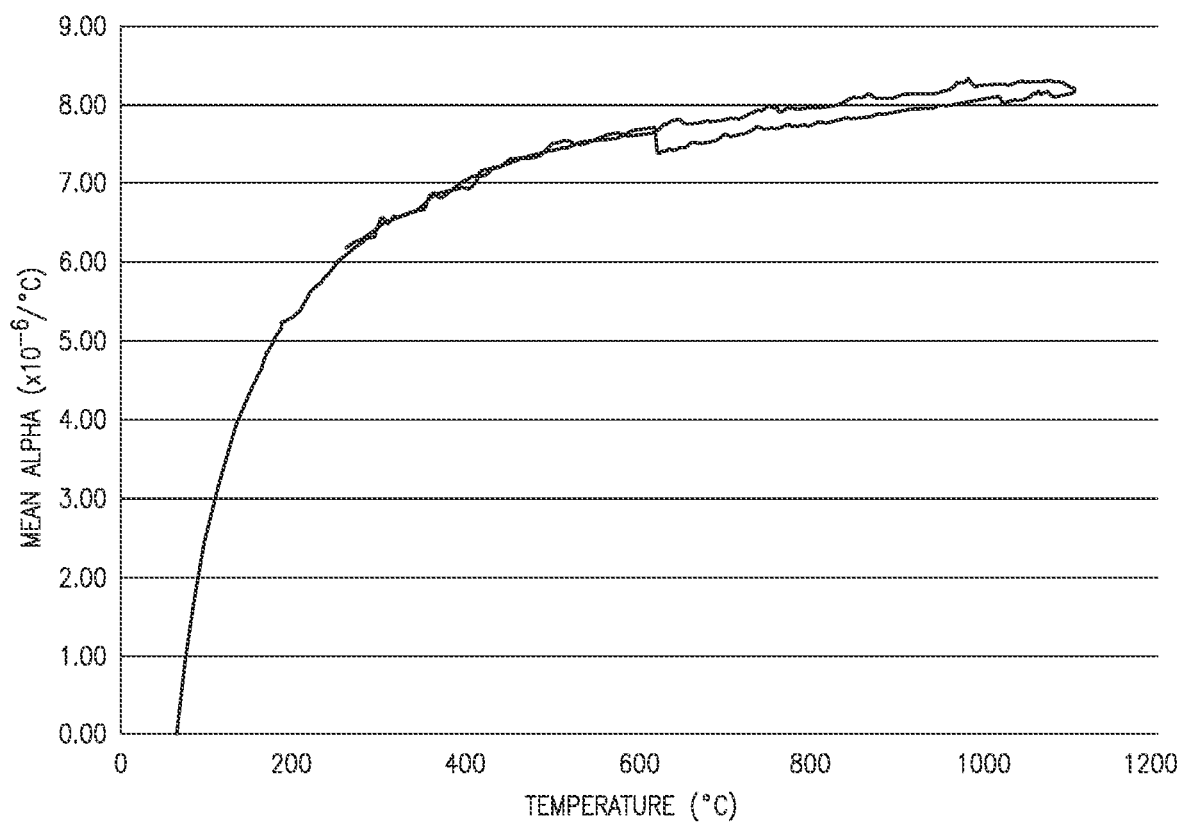
FIG. 8B illustrates experimental dilatometry measurements for a first spinel-structured oxide comprising $MgAl_2O_4$, according to embodiments.
Figure 8C:
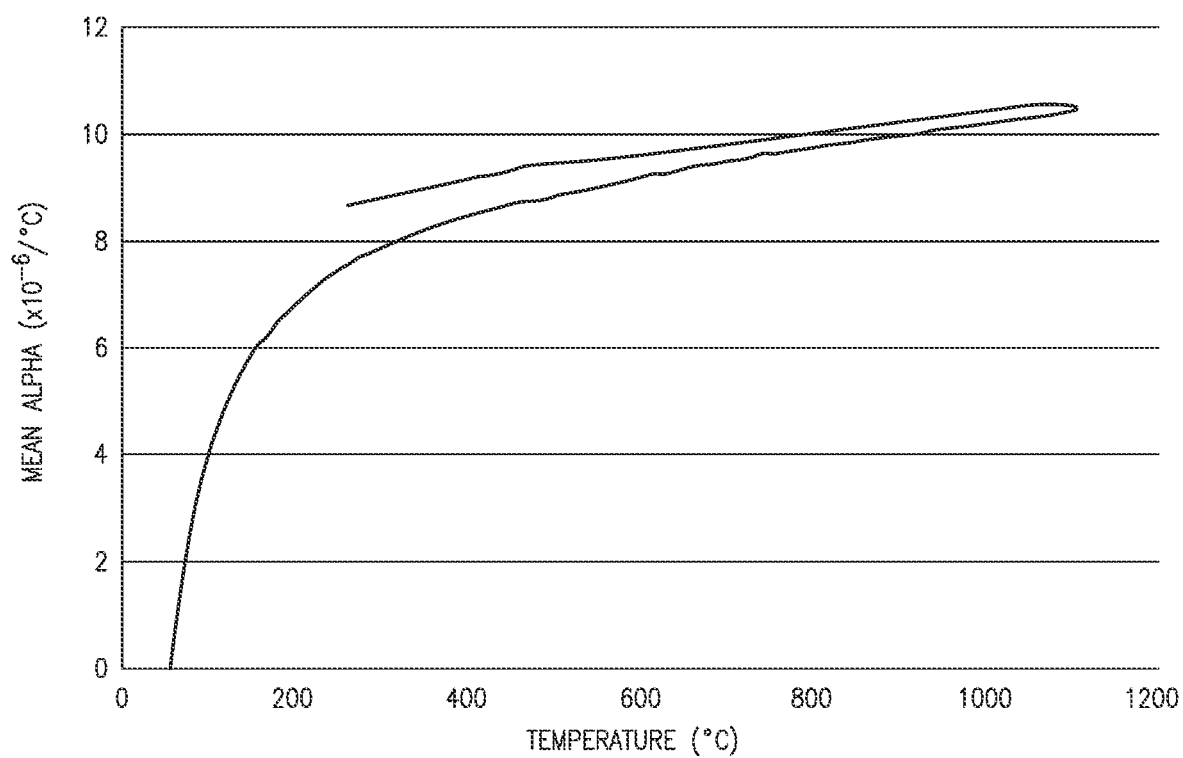
FIG. 8C illustrates experimental dilatometry measurements for a second spinel-structured oxide comprising $Mg_2Ti_2O_4$, according to embodiments.

FIG. 8A illustrates experimentally measured thermal expansion coefficient (a) as a function of temperature for an example nickel zinc ferrite composition ($Ni_{1-x}Zn_xFe_2O_4$). FIGS. 8B and 8C illustrate experimentally measured thermal expansion coefficients (a) as a function of temperature for an example first spinel-structured oxide comprising $MgAl_2O_4$ and an example second spinel-structured oxide comprising $Mg_2TiO_4$, respectively. In particular, the example first spinel-structured oxide for which the a is illustrated in FIG. 8B includes 84.90 weight % $MgAl_2O_4$, 8.95 weight % $ZnTiO_3$ and 6.15 weight % $Al_2O_3$, and the example second spinel-structured oxide for which the a is illustrated in FIG. 8C includes 84.90 weight % $Mg_2TiO_4$, 8.95 weight % $ZnTiO_3$ and 6.15 weight % $Al_2O_3$. Advantageously, the illustrated a values of the example first and second spinel-structured oxides illustrated in FIGS. 8B and 8C are compatible with a values of the example nickel zinc ferrite illustrated in FIG. 8A for glue-less attachment by co-firing of a magnetic inner portion 102, e.g., a disc or a rod, and a non-magnetic outer portion 104, e.g., a substrate surrounding the inner portion 102 as illustrated in FIGS. 4A-4B and 5A-5B. As a result, a solid solution formed by the first spinel-structured oxide comprising $MgAl_2O_4$ and the second spinel-structured oxide comprising $Mg_2TiO_4$ as end components shrink at a higher rate during the co-firing compared to the nickel zinc ferrites according to embodiments, such that the outer portion 104 shrinks to wrap the inner portion 102, to be mechanically glue-lessly attached thereto. In some embodiments, it can be advantageous for the first and second spinel-structured oxides to have thermal expansion coefficients that are similar or substantially the same as that of the nickel zinc ferrite being co-fired. In these embodiments, the thermal expansion coefficient can be in a range defined by any two values selected from 7, 7.5, 8, 8.5, 9, 9.5, or 10 ppm/° C.

Figure 9A:
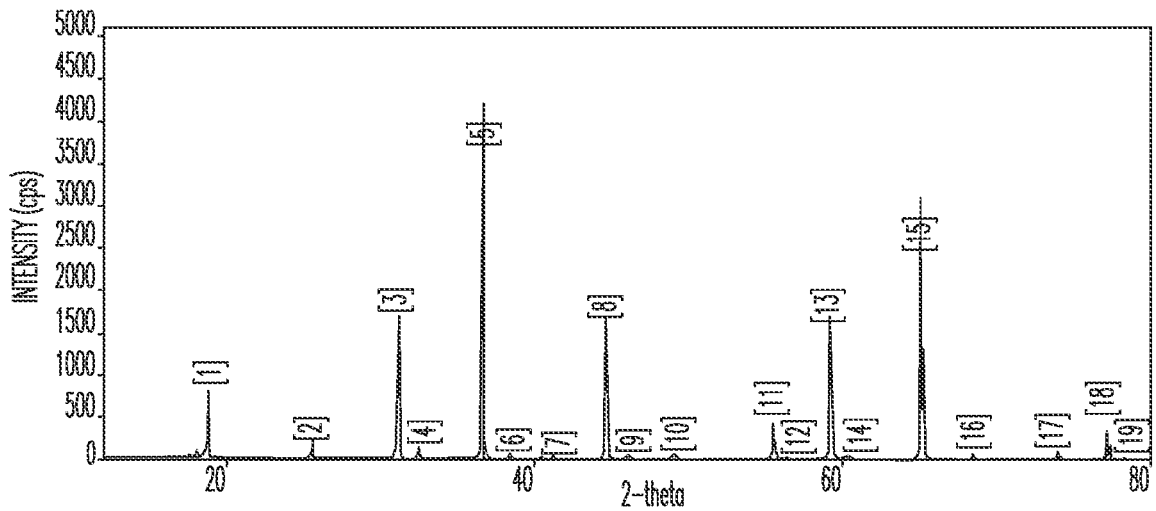
FIG. 9A illustrates experimental X-ray diffraction measurements for a first spinel-structured oxide comprising $MgAl_2O_4$, according to embodiments.

FIGS. 9A and 9B illustrate experimentally measured X-ray spectra for the example first spinel-structured oxide comprising $MgAl_2O_4$ corresponding to the composition described above with respect to FIG. 8B, and the example second spinel-structured oxide comprising $Mg_2TiO_4$ corresponding to the composition described above with respect to FIG. 8C, respectively. Each of FIGS. 9A and 9B show, for each diffraction peak, the diffraction angle 2θ, a corresponding lattice spacing d, a full width at half maximum (FWHM) and a relative intensity. It will be appreciated that these parameters contain information about the materials being analyzed, including, e.g., grain size, phases present and texture that may be present, to name a few.

5G Applications

Embodiments of the disclosed composite microstrip circulators can be particularly advantageous for 5$^{th}$ generation wireless system (5G) applications, though could also be used for early 4G and 3G applications as well. 5G technology is also referred to herein as 5G New Radio (NR). 5G networks can provide for significantly higher capacities than current 4G system, which allows for a larger number of consumers in an area. This can further improve uploading/downloading limits and requirements. In particular, the large number of circulators, such as those described herein, needed for 5G (typically 1 per front end module or FEM) requires further integration of components. The disclosed embodiments of circulators can allow for this integration and thus can be particularly advantageous. Other components in the front end module will be microstrip or SMT based.

Preliminary specifications for 5G NR support a variety of features, such as communications over millimeter wave spectrum, beam forming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

Figure 10:
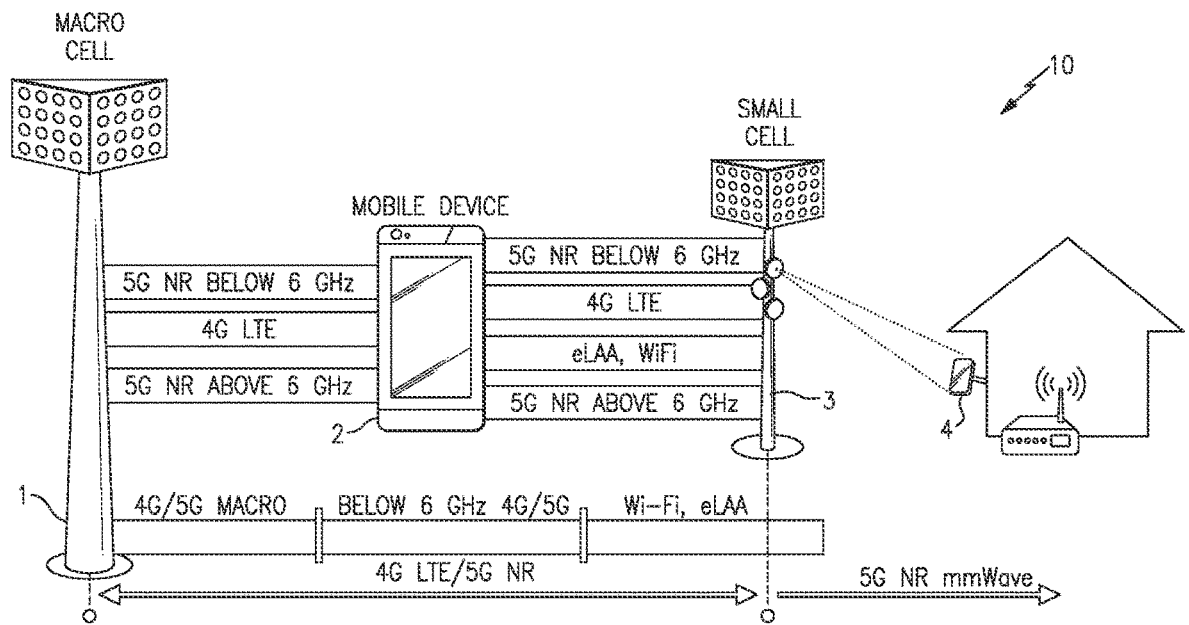
FIG. 10 is a schematic diagram of one example of a communication network.

FIG. 10 is a schematic diagram of one example of a communication network 10. The communication network 10 includes a macro cell base station 1, a mobile device 2, a small cell base station 3, and a stationary wireless device 4.

The illustrated communication network 10 of FIG. 10 supports communications using a variety of technologies, including, for example, 4G LTE, 5G NR, and wireless local area network (WLAN), such as Wi-Fi. Although various examples of supported communication technologies are shown, the communication network 10 can be adapted to support a wide variety of communication technologies.

Various communication links of the communication network 10 have been depicted in FIG. 10. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

As shown in FIG. 7, the mobile device 2 communicates with the macro cell base station 1 over a communication link that uses a combination of 4G LTE and 5G NR technologies. The mobile device 2 also communicates with the small cell base station 3 which can include embodiments of the disclosure. In the illustrated example, the mobile device 2 and small cell base station 3 communicate over a communication link that uses 5G NR, 4G LTE, and Wi-Fi technologies.

In certain implementations, the mobile device 2 communicates with the macro cell base station 2 and the small cell base station 3 using 5G NR technology over one or more frequency bands that are less than 6 Gigahertz (GHz). In one embodiment, the mobile device 2 supports a HPUE power class specification.

The illustrated small cell base station 3, incorporating embodiments of the disclosure, also communicates with a stationary wireless device 4. The small cell base station 3 can be used, for example, to provide broadband service using 5G NR technology over one or more frequency bands above 6 GHz, including, for example, millimeter wave bands in the frequency range of 30 GHz to 300 GHz.

In certain implementations, the small cell base station 3 communicates with the stationary wireless device 4 using beamforming. For example, beamforming can be used to focus signal strength to overcome path losses, such as high loss associated with communicating over millimeter wave frequencies.

The communication network 10 of FIG. 10 includes the macro cell base station 1, which can include embodiments of the disclosure, and the small cell base station 3. In certain implementations, the small cell base station 3 can operate with relatively lower power, shorter range, and/or with fewer concurrent users relative to the macro cell base station 1. The small cell base station 3 can also be referred to as a femtocell, a picocell, or a microcell.

Although the communication network 10 is illustrated as including two base stations, the communication network 10 can be implemented to include more or fewer base stations and/or base stations of other types.

The communication network 10 of FIG. 10 is illustrated as including one mobile device and one stationary wireless device. The mobile device 2 and the stationary wireless device 4 illustrate two examples of user devices or user equipment (UE). Although the communication network 10 is illustrated as including two user devices, the communication network 10 can be used to communicate with more or fewer user devices and/or user devices of other types. For example, user devices can include mobile phones, tablets, laptops, IoT devices, wearable electronics, and/or a wide variety of other communications devices.

User devices of the communication network 10 can share available network resources (for instance, available frequency spectrum) in a wide variety of ways.

Enhanced mobile broadband (eMBB) refers to technology for growing system capacity of LTE networks. For example, eMBB can refer to communications with a peak data rate of at least 10 Gbps and a minimum of 100 Mbps for each user device. Ultra-reliable low latency communications (uRLLC) refers to technology for communication with very low latency, for instance, less than 2 ms. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 10 can be used to support a wide variety of advanced communication features, including, but not limited to eMBB, uRLLC, and/or mMTC.

A peak data rate of a communication link (for instance, between a base station and a user device) depends on a variety of factors. For example, peak data rate can be affected by channel bandwidth, modulation order, a number of component carriers, and/or a number of antennas used for communications.

For instance, in certain implementations, a data rate of a communication link can be about equal to M*B*log$_2$(1+S/

N), where M is the number of communication channels, B is the channel bandwidth, and S/N is the signal-to-noise ratio (SNR).

Accordingly, data rate of a communication link can be increased by increasing the number of communication channels (for instance, transmitting and receiving using multiple antennas), using wider bandwidth (for instance, by aggregating carriers), and/or improving SNR (for instance, by increasing transmit power and/or improving receiver sensitivity).

5G NR communication systems can employ a wide variety of techniques for enhancing data rate and/or communication performance.

According to various embodiments, carrier aggregation can be used to widen bandwidth of the communication link by supporting communications over multiple frequency carriers, thereby increasing user data rates and enhancing network capacity by utilizing fragmented spectrum allocations.

Figure 11:
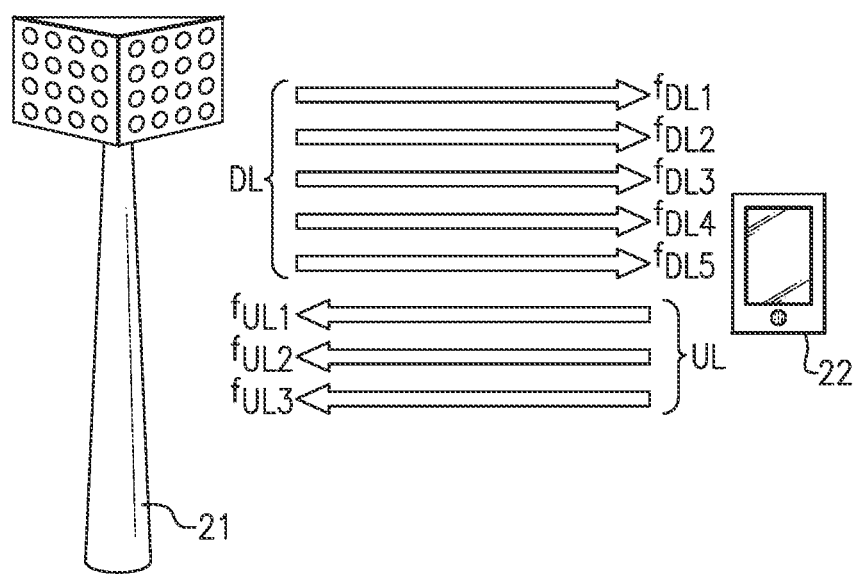
FIG. 11 is a schematic diagram of one example of a communication link using carrier aggregation.

In the illustrated example, the communication link is provided between a base station 21 and a mobile device 22. As shown in FIG. 11 the communications link includes a downlink channel used for RF communications from the base station 21 to the mobile device 22, and an uplink channel used for RF communications from the mobile device 22 to the base station 21.

Although FIG. 11 illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 11, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

With reference to FIG. 11, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Figure 12A:
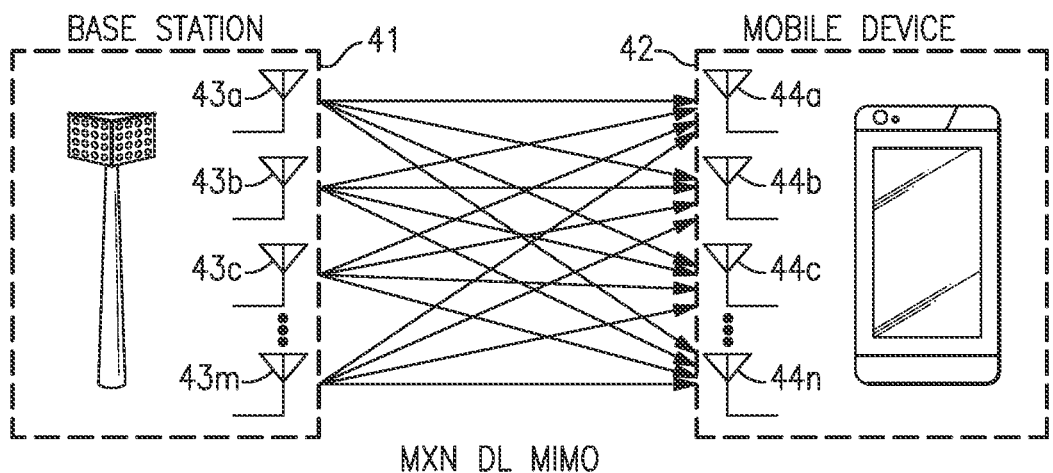
FIG. 12A is a schematic diagram of one example of a downlink channel using multi-input and multi-output (MIMO) communications.
Figure 12B:
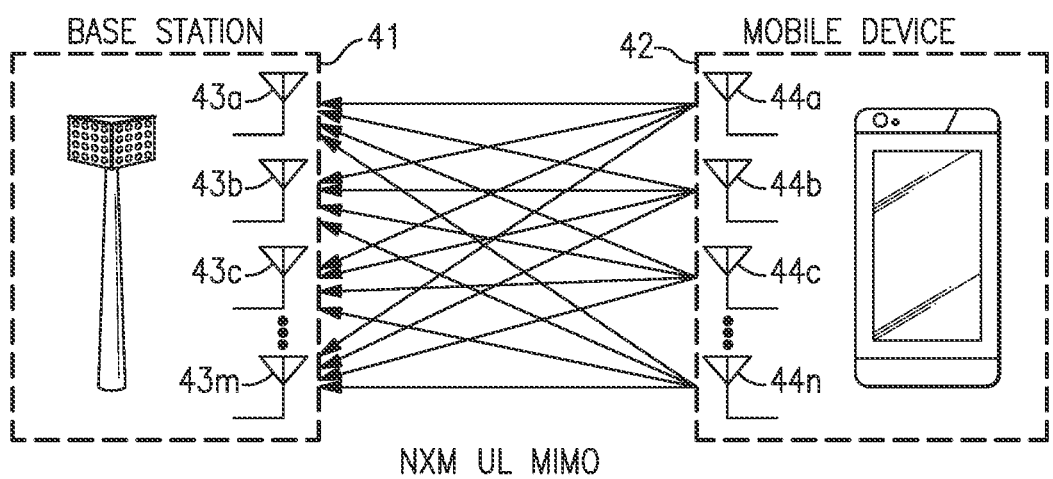
FIG. 12B is schematic diagram of one example of an uplink channel using MIMO communications.

FIG. 12A is a schematic diagram of one example of a downlink channel using multi-input and multi-output (MIMO) communications. FIG. 12B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 12A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 12A illustrates an example of M×N DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 12B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 12B illustrates an example of N×M UL MIMO.

By increasing the level or order of MIMO, bandwidth of an uplink channel and/or a downlink channel can be increased.

Although illustrated in the context of FDD, MIMO communications are also applicable communication links using TDD.

For these 5G networks, one form of base station will be massive multiple input, multiple output (MIMO) based, with an array of perhaps 64-128 antennas capable of multi-beam forming to interact with handheld terminals at very high data rates. Thus, embodiments of the disclosure can be incorporated into the base stations to provide for high capacity applications.

This approach is similar to radar phased array T/R modules, with individual transceivers for each antenna element, although massive MIMO is not a phased array in the radar sense. The objective is optimum coherent signal strength at the terminal(s) rather than direction finding. Further, signal separation will be time division (TD) based, requiring a means of duplexing/switching to separate Tx and Rx signals For discussion, it is assumed that there is one Tx, one Rx module, one duplexing circulator and one antenna filter per antenna. However, other configurations can be used as well.

FIG. 10 shows a simplified version of an RF transmission system, omitting drivers and switching logic. As shown, the system can include a number of different components, including a circulator. Thus, embodiments of the disclosure can be used as the circulator in the RF system, either for newly created systems or as improved replacements for the previous systems. Specifically, embodiments of the disclosure relate to hybrid solutions using a stripline circulator, and microstrip or stripline topology for the remaining components.

FIG. 11 illustrates the integrated component of FIGS. 5A-B discussed above onto the simplified RF antenna structure. As shown, the substrate can include the co-fired ferrite/dielectric tile for the circulator. In addition, a coupler, switch, and load can also be applied to the dielectric tile outside of the ferrite. The conductors and the ground plane could be in a thick film silver. In some embodiments, the circulator subassembly can also be integrated with the power amplifier (PA) and loud noise amplifier (LNA) modules.

Embodiments of the disclosure can have advantages over circulators known in the art. For example,
  Couplers and other transmission lines have much lower insertion loss compared with other couplers, such as semiconductor couplers
  Coupling is more consistent
  Loads can dissipate heat more easily compared with soft substrate
  Circulators have lower loss than all-ferrite substrate based devices
  The dielectric is temperature stable, assisting the coupler and circulator's performance
  The size of the devices can be reduced by using higher dielectric constant ceramic dielectric if required Further, embodiments of the ceramic circulator can have the following advantages:
  Heat/power dissipation/thermal conductivity for PA and load
  Isotropic dielectric (except TTB) for coupler/filter design
  Range of dielectric constant (4-100+) for size reduction
  Low dielectric loss (coupler/filter)
  Tight dielectric constant tolerance (coupler/filter/antenna)
  Stable dielectric constant over temperature (coupler/filter/circulator)
  Modest Cost On the other hand, soft substrate (e.g., softboards) can have the following disadvantages:
  Poor conductivity due to plastic conductivity
  Anisotropic (xy versus z direction)
  Only 3-10 with some, fixed with others
  Higher losses
  Looser tolerances
  Unstable over temperature Accordingly, embodiments of the disclosure can have significant advantages over circulators previously known in the art.

Figure 13:
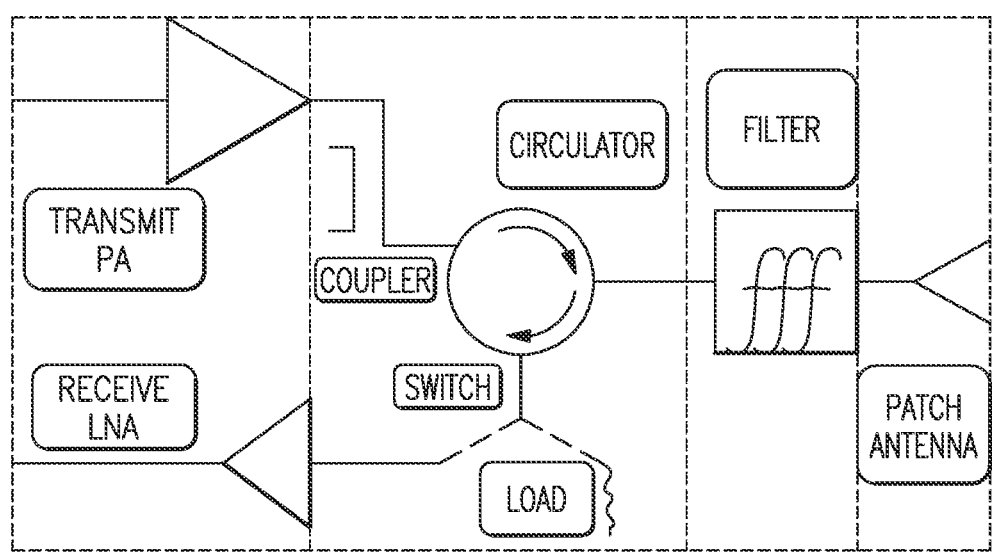
FIG. 13 illustrates a schematic of an antenna system.
Figure 14:
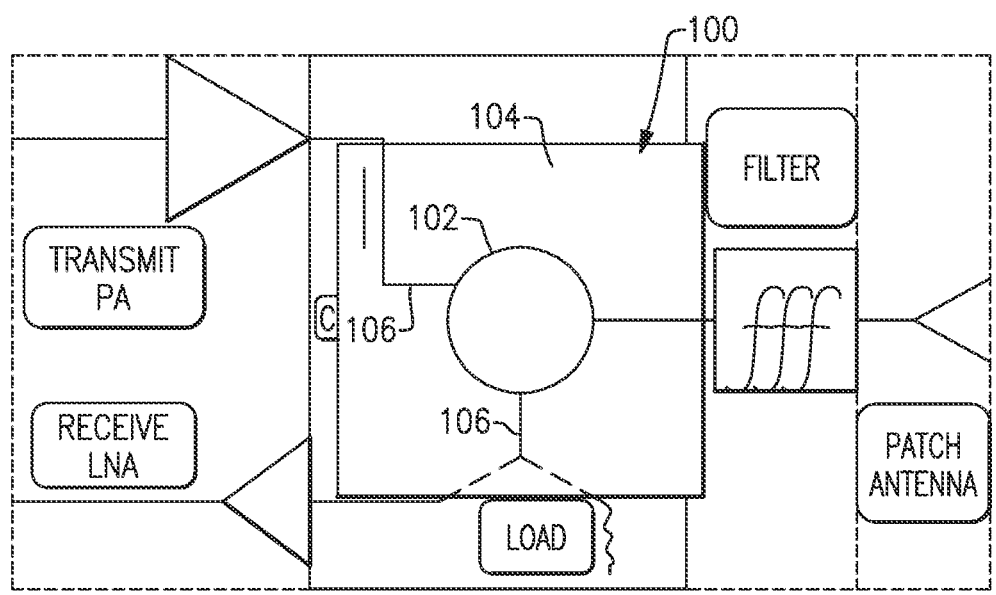
FIG. 14 illustrates a schematic of an antenna system with an embodiment of an integrated microstrip circulator.
Figure 15:
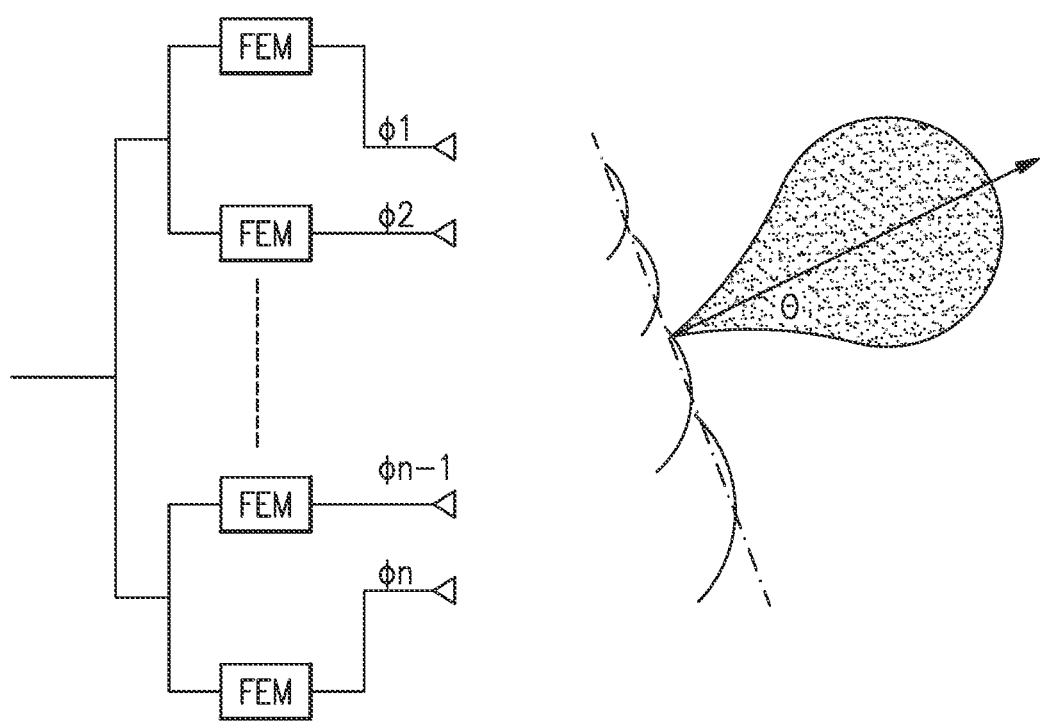
FIG. 15 illustrates a MIMO system incorporating embodiments of the disclosure.

FIG. 15 illustrates another embodiment of a MIMO system that the disclosed microstrip circulators can be incorporated into. With the advent of massive MIMO for 5G system the current antennas will be replaced with antenna arrays with, for example, 64 array elements. Each element can be fed by a separate front end module (FEM) including the blocks shown in FIGS. 13 and 14 in which embodiments of the microstrip circulator formed on the co-fired tile can be an integral component.

Figure 16:
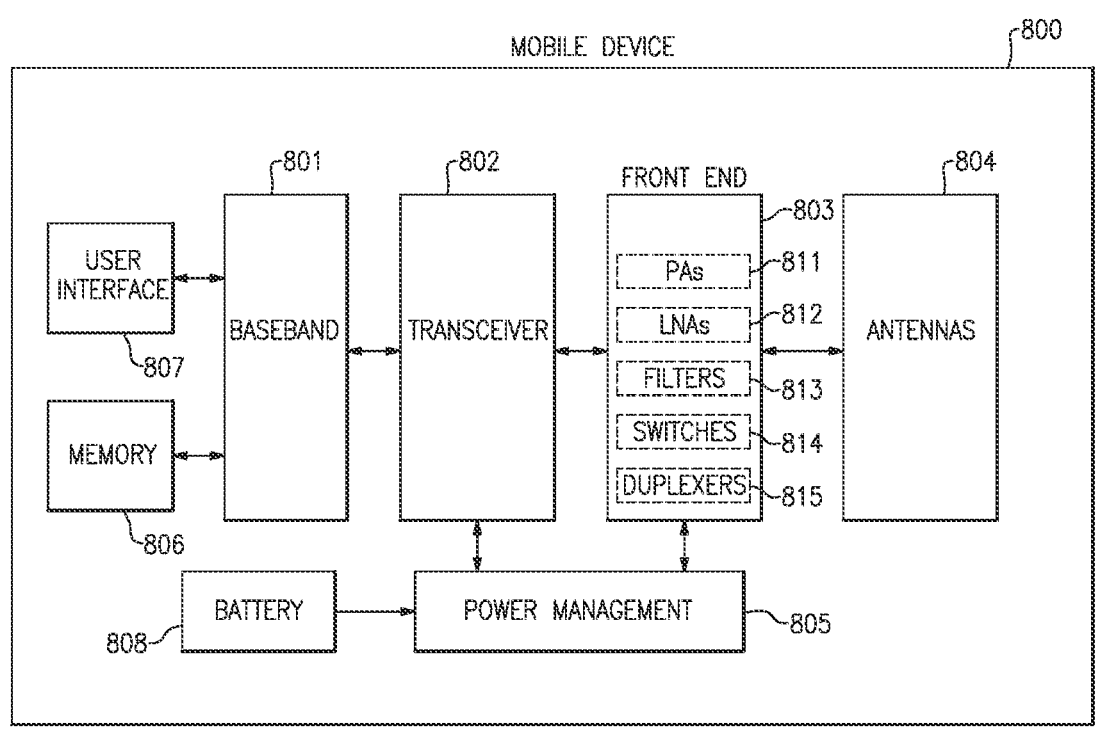
FIG. 16 is a schematic diagram of one example of a mobile device.

FIG. 16 is a schematic diagram of one example of a mobile device 800. The mobile device 800 includes a baseband system 801, a transceiver 802, a front end system 803, antennas 804, a power management system 805, a memory 806, a user interface 807, and a battery 808 and can interact with the base stations including embodiments of the microstrip circulators disclosed herein.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 16 as the transceiver 802. In one example, separate components (for instance, separate circuits or dies) can be provided for handling certain types of RF signals.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas associated transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

Figure 17:
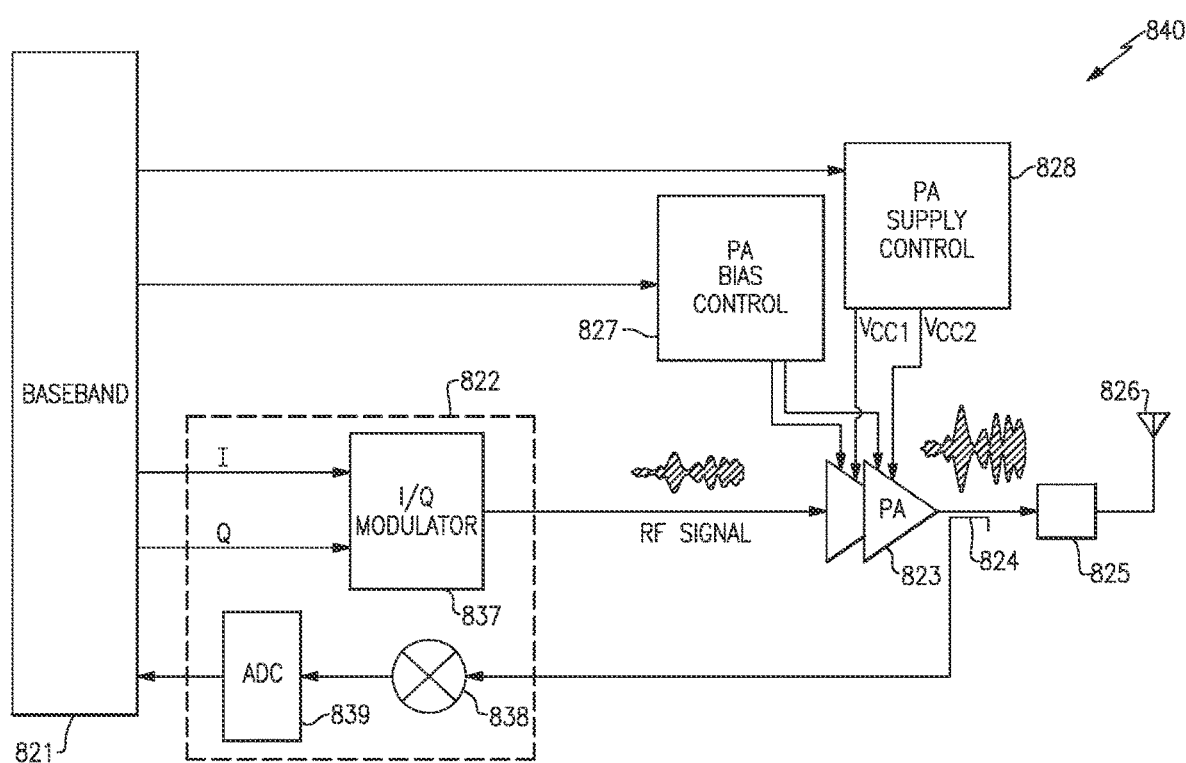
FIG. 17 is a schematic diagram of a power amplifier system according to one embodiment.

FIG. 17 is a schematic diagram of a power amplifier system 840 according to one embodiment. The illustrated power amplifier system 840 includes a baseband processor 821, a transmitter 822, a power amplifier (PA) 823, a directional coupler 824, a bandpass filter 825, an antenna 826, a PA bias control circuit 827, and a PA supply control circuit 828. The illustrated transmitter 822 includes an FQ modulator 837, a mixer 838, and an analog-to-digital converter (ADC) 839. In certain implementations, the transmitter 822 is included in a transceiver such that both transmit and receive functionality is provided. Embodiments of the disclosed microstrip circulators can be incorporated into the power amplifier system.

Methodology

Figure 18:
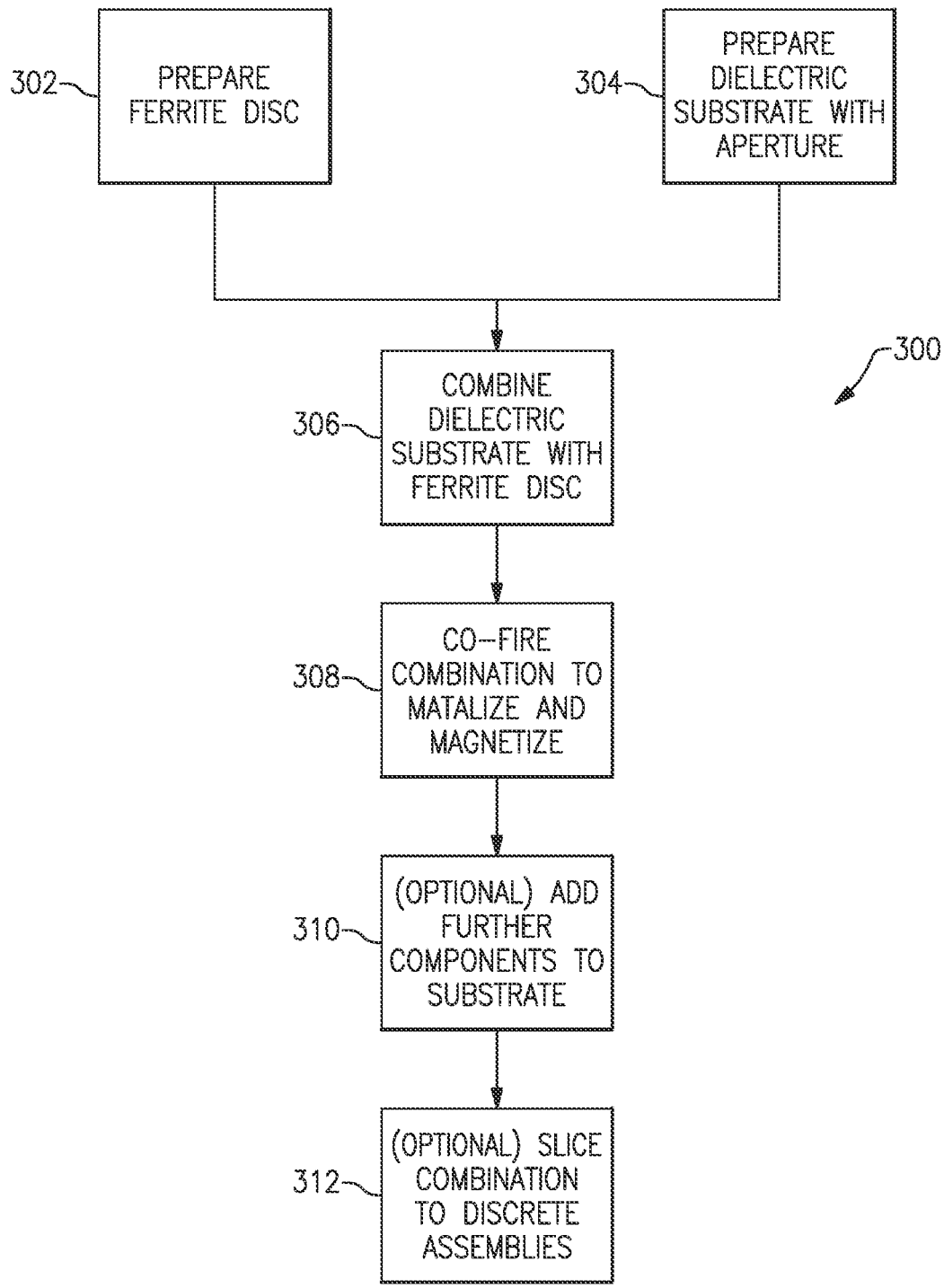
FIG. 18 illustrates a method of forming a composite integrated microstrip circulator.

Disclosed herein are embodiments of a process for making an integrated microstrip component. FIG. 18 discloses an embodiment of a process 300 that can be used.

Returning to FIG. 18, at step 302, a ferrite disc or cylinder can be formed from a magnetic ceramic material by any suitable conventional process known in the art for making such elements, i.e., magnetic oxides of the types used in high frequency electronic components. Similarly, at step 304, a substrate can be formed from a dielectric material by any suitable conventional process. In some embodiments, the ferrite disc can be sintered by firing it in a kiln. Some examples of materials and firing temperatures are set forth below, following this process flow description. However, persons skilled in the art to which the invention relates understand that the materials and processes by which magnetic ceramic and dielectric ceramic elements of this type are made are well known in the art. Therefore, suitable materials and temperatures are not listed exhaustively. All such suitable materials and process for making such rods, cylinders and similar elements of this type are intended to be within the scope of the invention.

At step 306, the disc can be combined into the dielectric substrate with the aperture. For example, the outside surface of the disc can be machined to ensure it is of an outside diameter (OD) that is less than the inside diameter (ID) of the substrate aperture. In some embodiments, the OD is slightly smaller than the ID to enable the disc to be inserted into the substrate.

In some embodiments, the pre-fired disc can be received in an unfired or "green" substrate to form the composite assembly 100 shown in FIGS. 4A-B.

At step 308, the disc and substrate can be co-fired. That is, composite assembly 100 is fired. The co-firing temperature can be lower than the temperature at which disc was fired, to ensure that the physical and electrical properties of the disc remain unchanged. The co-firing temperature can be within the well-known range in which such components are conventionally fired. Importantly, co-firing causes the substrate to shrink around the disc, thereby securing them together. Afterwards, the outside surface of the composite assembly 100 can then be machined to ensure it is of a specified or otherwise predetermined OD. Further, this step can be used to metalize and/or magnetize the composite assembly 100 if the ferrite disc has not previously been magnetized.

Steps 310 and 312 show optional steps that can be taken after the co-firing of the composite assembly 100. For example, additional components can be added 310 onto the substrate, such as circuitry, to form final electronic components. Further, in some embodiments the composite assembly 100 can be sliced 312, or otherwise partitioned, to form a number of discrete assemblies. In some embodiments, both these optional steps can be performed and the particular order is not limiting. In some embodiments, only one of the optional steps can be taken. In some embodiments, neither of the optional steps can be taken.

Accordingly, composite assemblies 100 can be used in manufacturing high frequency electronic components in the same manner as conventionally-produced assemblies of this type. However, the method of the present invention is more economical than conventional methods, as the invention does not involve the use of adhesives.

Figure 19:
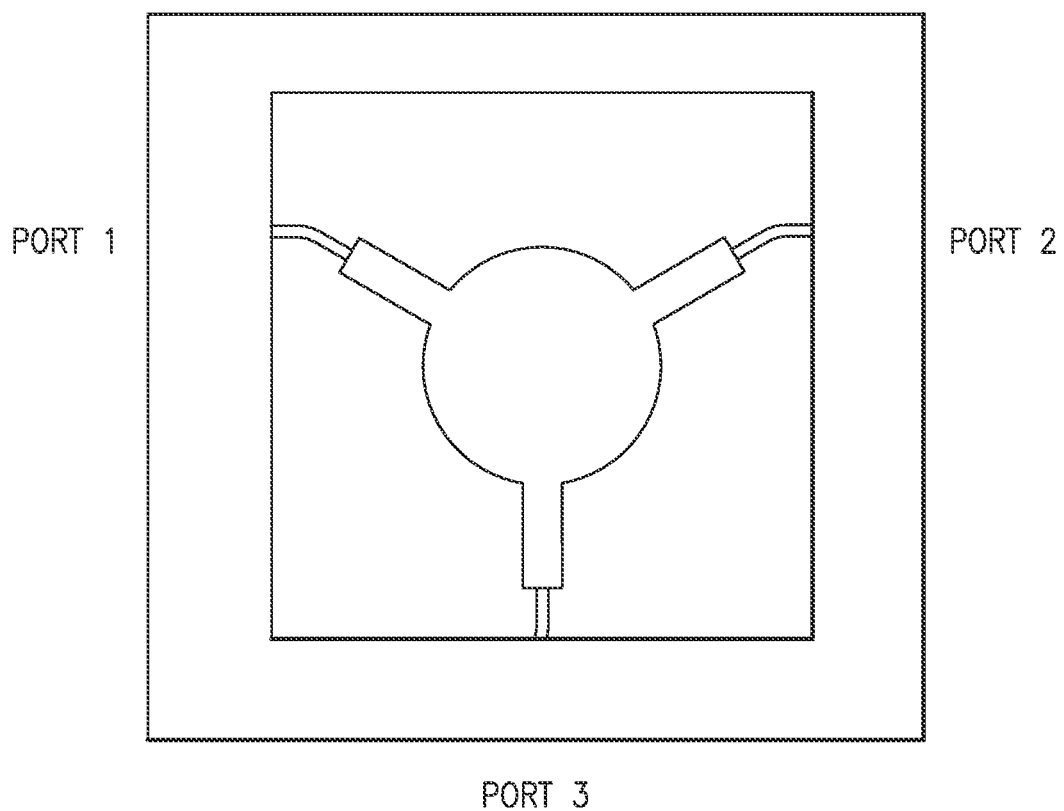
FIG. 19 illustrates an embodiment of an integrated microstrip circulator for testing.

FIG. 19 illustrates an example embodiment of a circulator as discussed herein. Thick film silver can be printed as the circuit. As per standard circulator applications, the circulator includes Port 1, Port 2, and Port 3. One of these ports can be blocked off to form an isolator.

Telecommunication Base Station

Circuits and devices having one or more features as described herein can be implemented in RF applications such as a wireless base-station. Such a wireless base-station can include one or more antennas configured to facilitate transmission and/or reception of RF signals. Such antenna(s) can be coupled to circuits and devices having one or more circulators/isolators as described herein.

Figure 20:
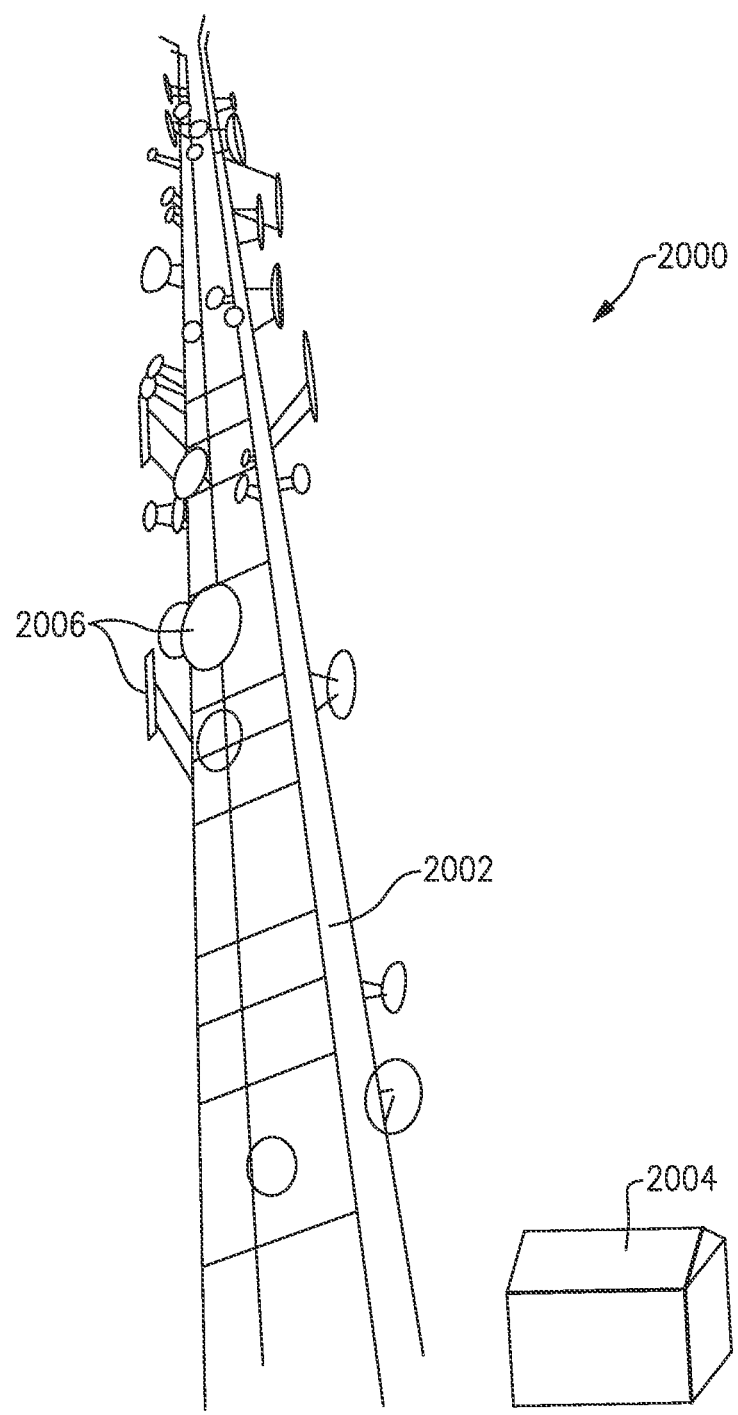
FIG. 20 illustrates a perspective view of a cellular antenna base station incorporating embodiments of the disclosure.

Thus, in some embodiments, the above-disclosed material can be incorporated into different components of a telecommunication base station, such as used for cellular networks and wireless communications. An example perspective view of a base station 2000 is shown in FIG. 20, including both a cell tower 2002 and electronics building 2004. The cell tower 2002 can include a number of antennas 2006, typically facing different directions for optimizing service, which can be used to both receive and transmit cellular signals while the electronics building 2004 can hold electronic components such as filters, amplifiers, etc. discussed below. Both the antennas 2006 and electronic components can incorporate embodiments of the disclosed ceramic materials.

Figure 21:
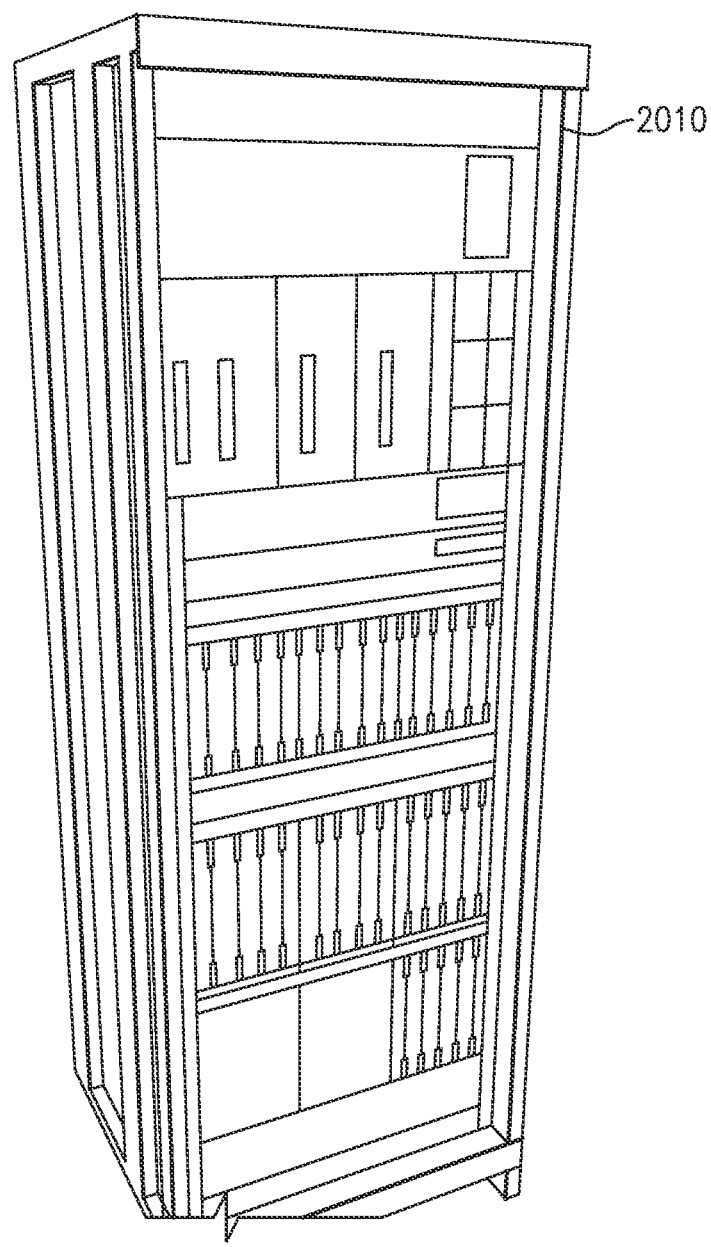
FIG. 21 illustrates housing components of a base station incorporating embodiments of the disclosed material.

FIG. 21 shows a base station 2010. The base station can include an antenna that is configured to facilitate transmission and/or reception of RF signals. Such signals can be generated by and/or processed by a transceiver. For transmission, the transceiver can generate a transmit signal that is amplified by a power amplifier (PA) and filtered (Tx Filter) for transmission by the antenna. For reception, a signal received from the antenna can be filtered (Rx Filter) and amplified by a low-noise amplifier (LNA) before being passed on to the transceiver. In the example context of such Tx and Rx paths, circulators and/or isolators having one or more features as described herein can be implemented at or in connection with, for example, the PA circuit and the LNA circuit. The circulators and isolators can include embodiments of the material disclosed herein. Further, the antennas can include the materials disclosed herein, allowing them to work on higher frequency ranges.

Figure 22:
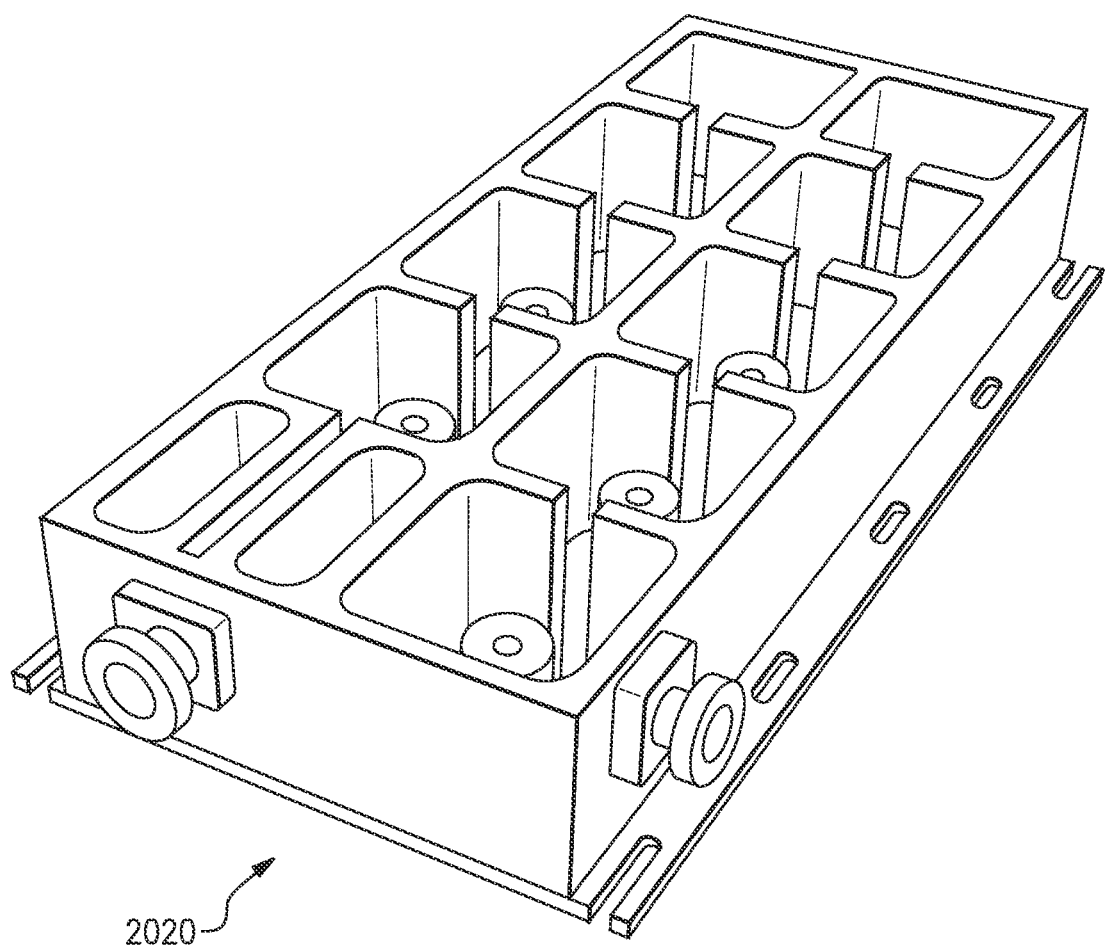
FIG. 22 illustrates a cavity filter used in a base station incorporating embodiments of the material disclosed herein.

FIG. 22 illustrates hardware 2020 that can be used in the electronics building 2004, and can include the components discussed above with respect to FIG. 12. For example, the hardware 2020 can be a base station subsystem (BSS), which can handle traffic and signaling for the mobile systems.

Figure 23:
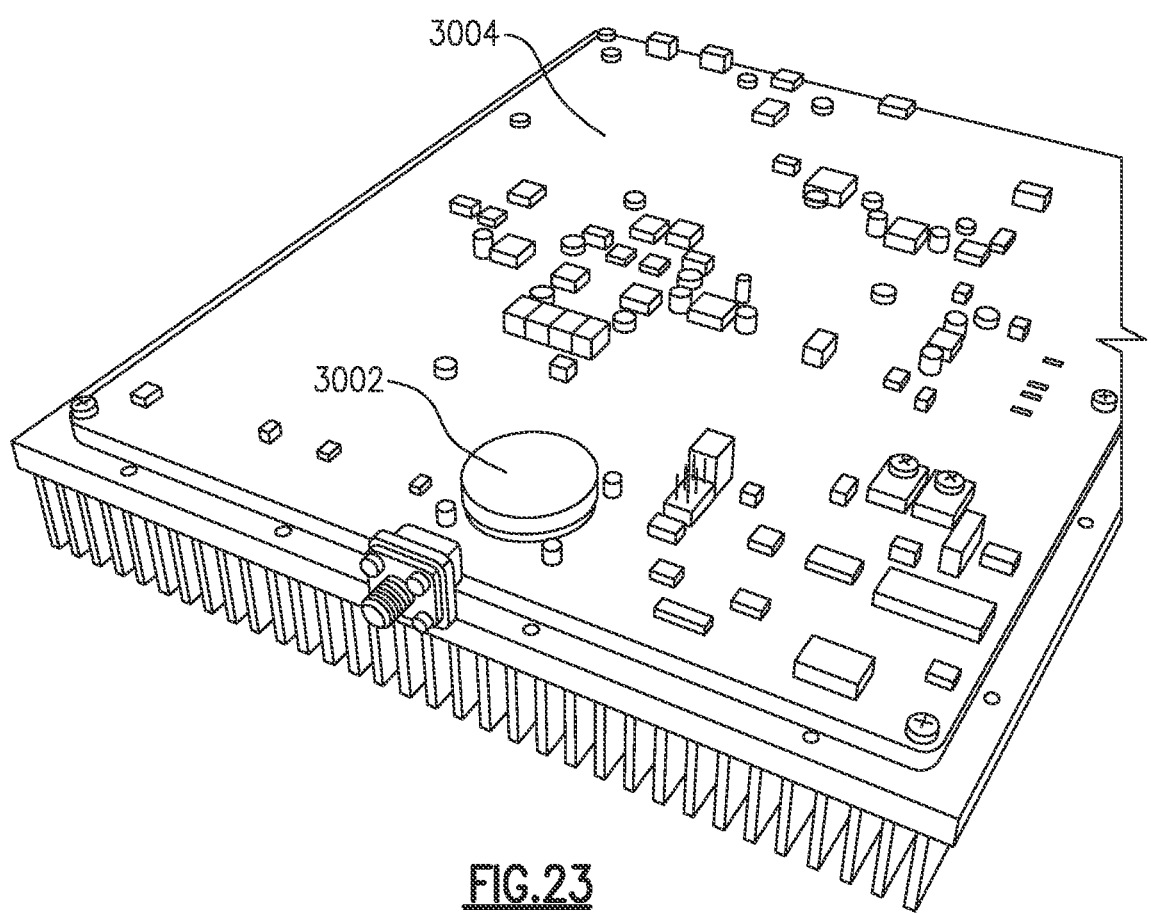
FIG. 23 illustrates an embodiment of a circuit board including embodiments of the material disclosed herein.

FIG. 23 illustrates a further detailing of the hardware 2020 discussed above. Specifically, FIG. 23 depicts a cavity filter/combiner which can be incorporated into the base station. The cavity filter can include, for example, bandpass filters such as those incorporating embodiments of the disclosed material, and can allow the output of two or more transmitters on different frequencies to be combined.

From the foregoing description, it will be appreciated that inventive products and approaches for composite microstrip circulators/isolators, materials, and methods of production are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

The invention claimed is:

1. A method of forming a composite article, the method comprising:
providing a pre-sintered magnetic article, the providing the pre-sintered magnetic article including pre-sintering, at a temperature higher than the co-firing temperature, a nickel zinc ferrite having a dielectric constant in a range between 5 and 10;
providing a green article contacting the pre-sintered magnetic article, the green article including one or more precursor oxides having a ratio of magnesium (Mg): aluminum (Al):titanium (Ti) of (2−x):(2x):(1−x), wherein 0<x<1; and
sintering the green article by co-firing the pre-sintered magnetic article and the green article at a co-firing temperature between 1300° C. and 1450° C., the compositions of the one or more precursor oxides being such that co-firing causes the one or more precursor oxides to form a non-magnetic spinel-structured oxide including $Mg_{2-x}Al_{2x}Ti_{1-x}O_4$ having a dielectric constant between about 7 and 14.

2. The method of claim 1 wherein the pre-sintered magnetic article is shaped to form an inner portion of the composite article and the green article is shaped to surround the pre-sintered magnetic article.

3. The method of claim 2 further comprising, prior to sintering, inserting the inner portion into an opening formed in the green article, and wherein sintering by co-firing causes the green article to shrink by a larger percentage compared to the inner portion, thereby causing an outer portion including the non-magnetic spinel-structured oxide to shrink-wrap around the inner portion, such that the inner and outer portions are attached to each other without use of an adhesive.

4. The method of claim 1 wherein the non-magnetic spinel-structured oxide includes a solid solution of $MgAl_2O_4$ and $Mg_2TiO_4$.

5. The method of claim 1 wherein the one or more precursor oxides include:
one or more Mg-containing oxides selected from the group consisting of $MgO_2$, $MgAl_2O_4$, and $Mg_2TiO_2$;
one or more Al-containing oxides selected from the group consisting of $Al_2O_3$ and $MgAl_2O_4$; and
one or more Ti-containing oxides selected from the group consisting of a titanium oxide and $Mg_2TiO_2$.

6. The method of claim 5 wherein the one or more precursor oxides further includes excess $Al_2O_3$ in an amount greater than zero and less than or equal to about 10 percent on the basis of a total weight of the one or more precursor oxides.

7. The method of claim 5 wherein the one or more precursor oxides further includes excess $ZnTiO_3$ in an amount greater than zero and less than or equal to about 10 percent on the basis of a total weight of the one or more precursor oxides.

8. The method of claim 1 wherein the non-magnetic spinel-structured oxide has a density between 3.498 g/cc and 3.569 g/cc.

9. The method of claim 1 wherein the pre-sintered magnetic article and the green article are co-fired at a co-firing temperature between 1350° C. and 1400° C.

10. The method of claim 1 wherein the non-magnetic spinel-structured oxide has a density between 3.50 g/cc and 3.55 g/cc.

11. A method of manufacturing a radio frequency circulator, the method comprising:
providing a disk-shaped magnetic portion, the providing the disk-shaped magnetic portion including pre-sintering, at a temperature higher than the co-firing temperature, a nickel zinc ferrite having a dielectric constant in a range between 5 and 10;
providing a green article contacting the disk-shaped magnetic portion, the green article including one or more precursor oxides having a ratio of magnesium (Mg): aluminum (Al):titanium (Ti) of (2−x):(2x):(1−x), wherein 0<x<1; and
sintering the green article by co-firing the disk-shaped magnetic portion and the green article at a co-firing temperature between 1300° C. and 1450° C., the compositions of the one or more precursor oxides are such that co-firing causes the one or more precursor oxides to form a non-magnetic spinel-structured oxide including $Mg_{2-x}Al_{2x}Ti_{1-x}O_4$, which surrounds the disk-shaped magnetic portion and has a dielectric constant between about 7 and 14.

12. The method of claim 11 wherein the disk-shaped magnetic portion is shaped to form an inner portion of the radio frequency circulator and the green article is shaped to surround the disk-shaped magnetic portion.

13. The method of claim 12 further comprising, prior to sintering, inserting the inner portion into an opening formed in the green article, and wherein sintering by co-firing causes the green article to shrink by a larger percentage compared to the inner portion, thereby causing an outer portion including the non-magnetic spinel-structured oxide to shrink-wrap around the inner portion, such that the inner and outer portions are attached to each other without use of an adhesive.

14. The method of claim 11 wherein the non-magnetic spinel-structured oxide includes a solid solution of $MgAl_2O_4$ and $Mg_2TiO_4$.

15. The method of claim 11 wherein the one or more precursor oxides include:
one or more Mg-containing oxides selected from the group consisting of $MgO_2$, $MgAl_2O_4$, and $Mg_2TiO_2$;
one or more Al-containing oxides selected from the group consisting of $Al_2O_3$ and $MgAl_2O_4$; and
one or more Ti-containing oxides selected from the group consisting of a titanium oxide and $Mg_2TiO_2$.

16. The method of claim 15 wherein the one or more precursor oxides further includes excess $Al_2O_3$ in an amount greater than zero and less than or equal to about 10 percent on the basis of a total weight of the one or more precursor oxides.

17. The method of claim 15 wherein the one or more precursor oxides further includes excess $ZnTiO_3$ in an amount greater than zero and less than or equal to about 10 percent on the basis of a total weight of the one or more precursor oxides.

18. The method of claim 11 wherein the non-magnetic spinel-structured oxide has a density between 3.498 g/cc and 3.569 g/cc.

19. The method of claim 11 wherein the disk-shaped magnetic portion and the green article are co-fired at a co-firing temperature between 1350° C. and 1400° C.

20. The method of claim 11 wherein the non-magnetic spinel-structured oxide has a density between 3.50 g/cc and 3.55 g/cc.

* * * * *